(12) United States Patent
Cunningham et al.

(10) Patent No.: US 8,215,166 B2
(45) Date of Patent: Jul. 10, 2012

(54) CAPACITIVE PROBES AND SENSORS, AND APPLICATIONS THEREFOR, AND MULTIMODE WIRELESS DEVICES

(75) Inventors: J. Vern Cunningham, Aurora (CA); Mircea Dan Paul, Richmond Hill (CA); Daniel Budurea, Mississauga (CA)

(73) Assignee: Cube Investments Limited, Aurora, ON (CA)

( * ) Notice: Subject to any disclaimer, the term of this patent is extended or adjusted under 35 U.S.C. 154(b) by 422 days.

(21) Appl. No.: 12/285,677

(22) Filed: Oct. 10, 2008

(65) Prior Publication Data
US 2009/0139325 A1 Jun. 4, 2009

Related U.S. Application Data

(60) Provisional application No. 60/960,726, filed on Oct. 11, 2007.

(51) Int. Cl.
*G01F 23/26* (2006.01)
(52) U.S. Cl. ..................... 73/304 C
(58) Field of Classification Search ............. 73/304 C
See application file for complete search history.

(56) References Cited

U.S. PATENT DOCUMENTS

| | | | |
|---|---|---|---|
| 5,050,431 A * | 9/1991 | McDonald | 73/304 C |
| 5,399,979 A | 3/1995 | Henderson et al. | |
| 6,101,873 A | 8/2000 | Kawakatsu et al. | |
| 6,164,132 A * | 12/2000 | Matulek | 73/304 C |
| 6,343,752 B1 | 2/2002 | Sleasman et al. | |
| 6,423,213 B1 | 7/2002 | Mazurek | |
| 6,437,772 B1 | 8/2002 | Zimmerman et al. | |
| 6,647,782 B2 | 11/2003 | Toyoda | |
| 6,761,067 B1 | 7/2004 | Capano | |
| 6,776,900 B2 | 8/2004 | Mazurek et al. | |
| 6,951,615 B2 | 10/2005 | Tripodi et al. | |
| 7,284,427 B2 | 10/2007 | Calabrese | |
| 2006/0055503 A1 | 3/2006 | Tanida | |

FOREIGN PATENT DOCUMENTS

| | | |
|---|---|---|
| EP | 044434 | 1/1982 |
| EP | 01589327 | 10/2005 |
| EP | 1744132 | 1/2007 |
| WO | WO 2004087282 | 10/2004 |

OTHER PUBLICATIONS

International Preliminary Report on Patentability for PCT/CA2008/001818 dated Apr. 13, 2010 based on and including the Written Opinion of the International Search Authority.
International Search Report for PCT/CA2008/001818 dated Jan. 29, 2009.

* cited by examiner

*Primary Examiner* — Hezron E Williams
*Assistant Examiner* — Paul West

(57) ABSTRACT

Sensor includes electrodes on internal layer of multilayer printed circuit board, and sensing circuitry drives electrodes and reads signal having characteristic based upon capacitance between electrodes. Board may have first layer second layer, with electrodes between layers. One layer may be thicker than other layer such that capacitance external to board is primarily contributed from adjacent other layer. Electrodes may be on internal surface and sensing circuitry may be on opposing external surface. Components for sensing circuitry may be assembled to board such that board and components are multilayer printed circuit board assembly. Circuitry having wireless transmitter and wireless receiver, wherein circuitry has operating mode to transmit signals remotely through transmitter and ship mode wherein transmitter is silenced, and in operating mode circuitry listens for signals indicating transmitted signal has been received, and if receiver has not received acknowledgement one signal then circuitry enters ship mode.

21 Claims, 28 Drawing Sheets

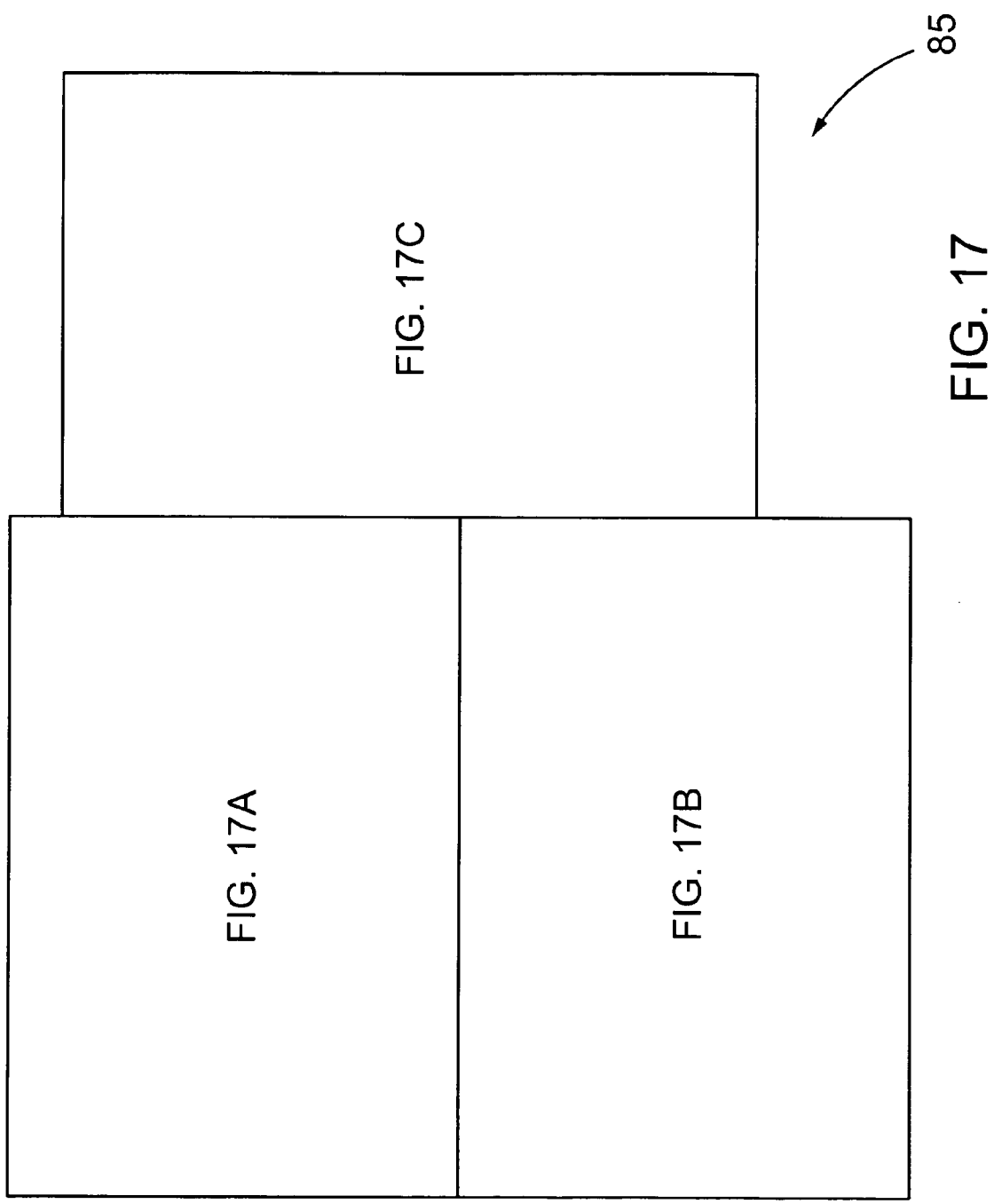

CAPACITIVE PROBES AND SENSORS, AND APPLICATIONS THEREFOR, AND MULTIMODE WIRELESS DEVICES

CROSS-REFERENCE TO RELATED APPLICATIONS

This application claims the benefit of the filing date of U.S. Patent Application No. 60/960,726 filed Oct. 11, 2007 under the title GREASE INTERCEPTORS AND PROBES AND SENSORS THEREFOR, the contents of which is hereby expressly incorporated by reference into the detailed description hereof.

FIELD OF THE INVENTION

In some aspects the invention relates to capacitive probes and sensors, and to systems using such capacitive probes and sensors. In other aspects the invention relates to devices containing wireless transmitters.

BACKGROUND

Capacitive probes and sensors are often utilized to sense the presence of a material. Waste systems are an example of an application for capacitive sensors. Grease interceptors are a subset of waste systems.

Grease interceptors are typically installed in restaurants and other locations where grease may enter the effluent stream. In many jurisdictions such interceptors are mandatory to prevent grease from clogging the local waste handling system.

Many grease interceptors are known. In its basic form, an interceptor has a storage tank with an inlet and an outlet. The inlet receives an effluent stream from which grease is to be trapped, and forces the stream to the bottom of the tank from which grease floats in the tank above a layer of water. Water is again forced to the bottom before exiting through the outlet.

Over time, grease will accumulate in the tank from the top down. Eventually the tank will need to be emptied of grease to prevent blockage of the effluent stream. This can be accomplished manually by opening the tank and removing the grease. Alternatively, the grease can be heated, liquefied and sucked out. Some systems and methods for automating this process are in use. For manual applications services are typically contracted to maintain the tank for a particular location.

An estimate can be made of how often a particular size of tank will need to be emptied and the service is contracted to maintain the tank periodically according to the estimate. This can result in the tank filling up before maintenance occurs, with a resultant disruption of business or rush maintenance order. Alternatively, the tank may not be nearly full and servicing could have waited. In either case the servicing is inefficient.

Different systems have been used to provide an indication that the tank is full or nearly full. Of course, the tank can be manually checked periodically; however, the tank is often not easily acceptable and the process can be unpleasant. Automated systems include, for example, conductive cylindrical rods with a protective coating that extend through a hole in the top of the tank. The rod is wired to a continuous oscillating signal generator drawing mains AC power. A return path for the signal is provided through a wall of the tank if the tank is conductive; otherwise, a second rod spaced apart from the first rod may be used for a return path. Depending on the capacitance between the rod and the return path, the signal from the signal generator will have a different period in the return path. This change in period is detected. The probe is calibrated to the tank such that the level of water can be deduced from the period of the resulting signal. The level of grease is assumed to start above the level of water.

An alarm can be set off when the resulting signal indicates the tank is full or near full. The maintenance service can then be called. Alternatively, the control unit may have circuitry to call the maintenance service to schedule maintenance, or to accept a call from the maintenance service or otherwise monitor to check the status of the tank.

Other waste systems such as sewage pumping systems that turn on a pump when sewage reaches a certain level in the tank and turn the pump off when the sewage falls below a certain level may also utilize capacitive sensors for sensing water levels before, for example, turning on or off pumps within the system.

It is known to utilize the capacitance between conductive armatures on printed circuit boards in sensors. Such armatures are usually referred to as electrodes, which term will be utilized from now on in this description.

Improvement or alternatives to existing capacitive sensors and their methods of operation are desirable. Improvements or alternatives to existing waste systems are also desirable.

Wireless transmitters in devices need to be silenced under certain circumstances, such as when in an airplane. This is typically performed through manual entry such as a button; however, where the device is to be sealed manual entry devices can be prone to failure.

Improvements or alternatives to devices using manual entry for silencing wireless transmitters are desirable.

SUMMARY

In a first aspect the invention provides a sensor including a multilayer printed circuit board having a probe with two electrodes side by side on a single buried of a first surface of the printed circuit board, and sensing circuitry on an outer second surface of the printed circuit board to drive the electrodes and sense a signal having a characteristic dependent on the capacitance between the electrodes. The sensor also has a cover about the sensing circuitry in sealed connection with the printed circuit board outer surface.

The first surface of the printed circuit board and the second surface of the printed circuit board may be opposing surfaces of a first layer of the printed circuit board. The printed circuit board further may include a second layer sealed to the first surface of the first layer about the two electrodes.

The capacitance between the electrodes may be provided through the first layer of the printed circuit board and the first layer is sufficiently thin such that the probe has a sufficient range of capacitance for sensing when the first layer is adjacent air and when the probe is adjacent water.

The electrodes may be separated by a narrow uniform gap such that the probe has a sufficient range of capacitance for sensing when the probe is adjacent air and when the probe is adjacent water. The capacitance between the electrodes may be the capacitance between the electrodes through the first layer of the printed circuit board and the first layer may be sufficiently thin and the electrodes may be separated by a narrow uniform gap such that the probe has a sufficient range of capacitance for sensing when the probe is adjacent air and when the probe is adjacent water.

The sensing circuitry may drive the electrodes to charge the capacitance between the electrodes and sense a charging time constant of the signal. The sensing circuitry may drive the electrodes to charge the capacitor and sense a frequency of the signal.

The sensor may be configured to sleep for an extended time between successive cycles of driving the electrode and sensing the signal. The printed circuit board may further include a wireless radio frequency transmitter to transmit a signal remote from the sensor containing information based on the sensed capacitance.

In a second aspect the invention provides a sensor including a printed circuit board having a probe with two electrodes side by side on a first surface of the printed circuit board, and sensing circuitry on a surface of the printed circuit board to drive the electrodes and sense a signal having a characteristic dependent on the capacitance between the electrodes through the first and second surfaces of the printed circuit board.

In a third aspect the invention provides a sensor including a printed circuit board having a probe with a plurality of electrode sections. Each electrode section includes two electrodes side by side on a first surface of the printed circuit board. The printed circuit board further includes sensing circuitry to drive the electrodes of each electrode section and sense one or more signals having a characteristic dependent on the capacitances between the electrodes of the respective electrode sections.

In a fourth aspect the invention provides a sensing system including a sensor of the above aspects and a remote unit to receive a signal from the sensor and determine a level of grease adjacent the probe.

The remote unit may have a display to display information about a level of grease where the sensor is installed.

In a fifth aspect the invention provides a grease interceptor including a tank to intercept grease, and a sensing system of the above aspects. The sensor is installed in the tank and senses capacitance of contents within the tank and a remote unit displays a level of grease within the tank.

In a sixth aspect the invention provides a method of sensing grease within a grease interceptor tank including driving the sensor of an above aspect with a pulse, sensing the time constant of a resistor-capacitor (RC) circuit provided by the sensor through the probe to determine a measure of capacitance for the probe when in contact with grease, water or a combination thereof.

The method may further include wirelessly transmitting a signal remote from the sensor containing information based on the sensed capacitance. The method may further include remotely receiving the signal, and determining a level of grease on the probe. The sensor may be installed in a grease interceptor tank, and the method may further include remotely receiving a sensor signal, and determining and displaying to a user a level of grease in the tank based on the received signal.

In a seventh aspect the invention provides a device including first circuitry having a wireless transmitter and a wireless receiver, wherein the first circuitry has two modes, an operating mode to transmit signals remotely through the wireless transmitter and a ship mode wherein the transmitter is silenced, and wherein in the operating mode the first circuitry listens through the wireless receiver for signals indicating a transmitted signal has been received, and if the receiver has not received an acknowledgement signal for at least one transmitted signal then the first circuitry enters the ship mode.

When in ship mode, the first circuitry may wait to receive a signal wirelessly through the wireless receiver indicating that the first circuitry should switch to the operating mode, and switch from the ship mode to the operating mode on receipt of such signal.

In an eighth aspect the invention provides a system including the device of the above aspect as a first device, and a second device including second circuitry that includes a wireless receiver and wireless transmitter, wherein the second circuitry is configured to listen through the second circuitry wireless receiver for wireless signals from the first circuitry and, upon receipt of a signal from the first circuitry, to transmit an acknowledgement signal through the second circuitry wireless transmitter.

In a ninth aspect the invention provides a sensor including electrodes on an internal layer of an multilayer printed circuit board, and sensing circuitry to drive the electrodes and to read a signal having a characteristic based upon the capacitance between the electrodes including capacitance external to the printed circuit board.

The printed circuit board may have a first layer and a second layer, with the electrodes between the layers. A first layer of the printed circuit board may be thicker than a second layer such that capacitance external to the printed circuit board is primarily contributed from adjacent the second layer.

The electrodes may be on an internal surface of the second layer and the sensing circuitry may be on an opposing external surface of the second layer.

The components for the sensing circuitry may be assembled to the multilayer printed circuit board such that the board and components are a multilayer printed circuit board assembly.

In a tenth aspect the invention provides a sensor for use at an interface between first and second materials of differing dielectric constants. The sensor includes electrodes, sensing circuitry to drive the electrodes and to read a signal having a characteristic based upon the capacitance between the electrodes including capacitance external to the printed circuit board, and circuitry to determine using a threshold if the read signal is above or below a given threshold indicating that the electrodes are covered by the first material.

Features of one aspect may be utilized in other aspects. Other aspects of the invention and further details of the above aspects will be evident from the detailed description, claims, and drawings herein. This includes for example the utilization of a threshold to determine when an electrode pair is considered to be covered by a material.

BRIEF DESCRIPTION OF THE DRAWINGS

For a better understanding of the present invention and to show more clearly how it may be carried into effect, reference will now be made, by way of example, to the accompanying drawings that show preferred embodiments of the present invention and in which.

DETAILED DESCRIPTION

Figure 1:
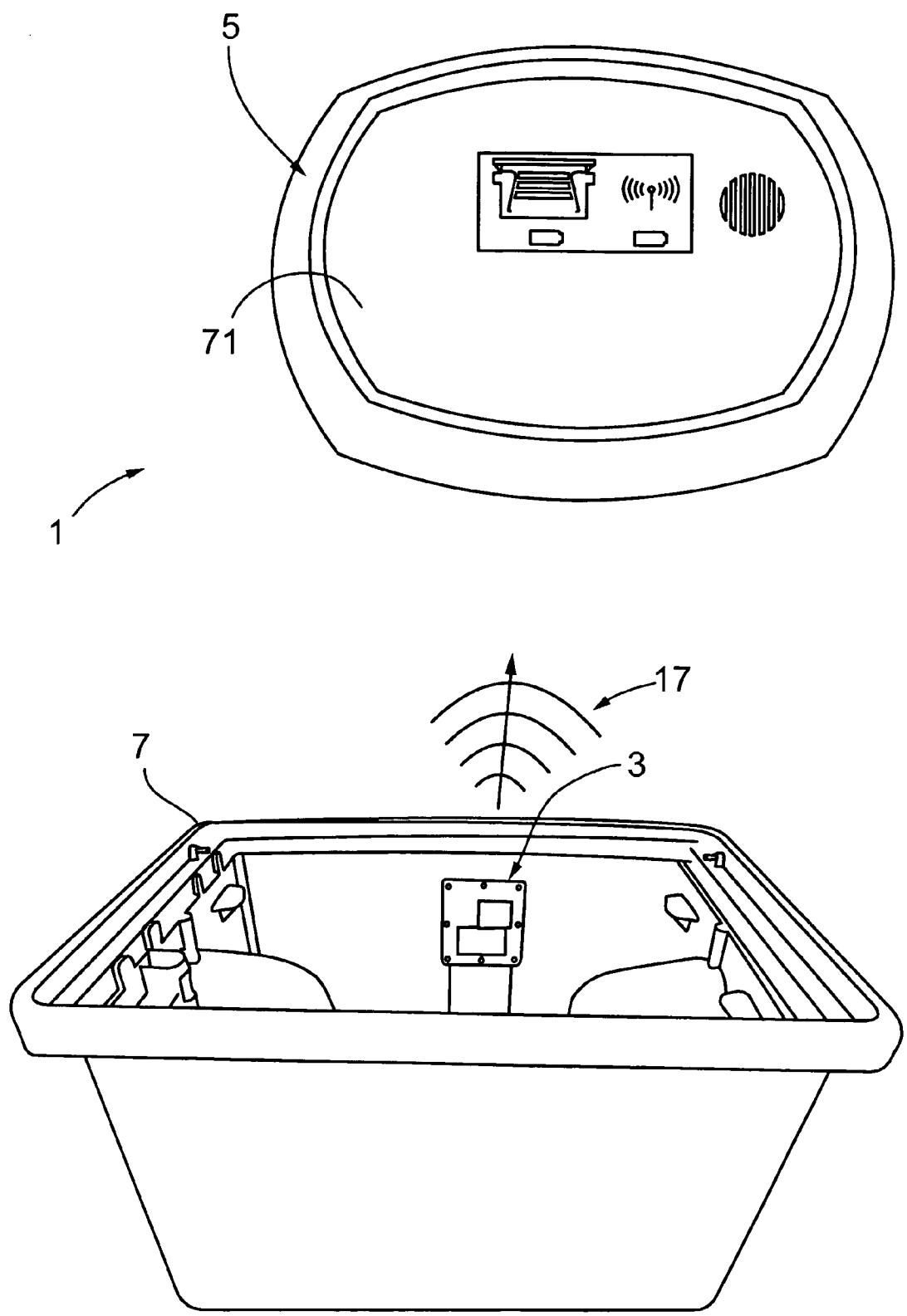
FIG. 1 is a graphic illustration of a grease interceptor tank with a sensing system in accordance with an example embodiment of an aspect of the invention.

Throughout this description and the claims reference will be made to "capacitance between", for example, two electrodes. Capacitance between, for example, two electrodes includes any and all capacitance between the electrodes including any capacitance from any material in the field of the electrodes, which material may be in a volume bounded by straight lines from the perimeter of one electrode to another, or outside that volume.

This description is generally being made with reference to sensing of grease and water. It is to be understood that the devices and methods described herein can also be applied to sensing in other types of systems, such as for example waste systems where sensing is performed on a level of a water-based liquid at an interface to air in place of the grease. In this case the level may rise vertically on the sensor toward full and the resulting data may be interpreted and utilized accordingly, for example, to automate pumps or display levels. Such systems may include applications where it is desired to sense full, empty or other conditions of the system.

As will be understood by those skilled in the art, the devices and methods may also be applied to other interfaces between materials having differing capacitances, whether such materials are liquids or solids.

Accordingly, all references herein to grease and water can be replaced for general applications by a first material and a second material having substantially different dielectric constants to allow for sensing.

Ground electrodes and sense electrodes will be referred to herein. It is to be understood that ground is a relative potential and not necessarily an earth ground. Typically ground will be provided by a negative terminal of a battery in a battery operated device; however, it is possible to utilize the positive terminal with possible consequent modifications to related circuitry. A sense electrode is one that provides a varying output for production of signals based on the capacitance between the ground electrode and sense electrode. It is to be understood that the ground electrode may be attached to a varying potential with the capacitance affected signal processed taking into account the variance of the ground potential.

Similar reference numerals are used for elements of different components of particular embodiments, sometimes within the same embodiment. As the context requires, the description for these elements may be particular to the component with which the element is associated. As an example, U1 is often used as a generic reference for a first integrated circuit in a circuit diagram; another circuit diagram may also have a U1. These elements need not be, and are often not, the same.

Referring to FIG. 1, a grease interceptor level monitor system 1 has a grease sensor 3 and a remote unit 5. It is to be noted in the FIG. that the grease sensor 3 has been shown without its back and cover for placement purposes only. Reference is made to other FIGS. herein to show the back and cover. In use, the sensor 3 is mounted in a grease interceptor tank 7 to sense grease levels in the tank 7 (shown with cover removed) and transmit the data to the remote unit 5 to be displayed and logged.

Figure 2:
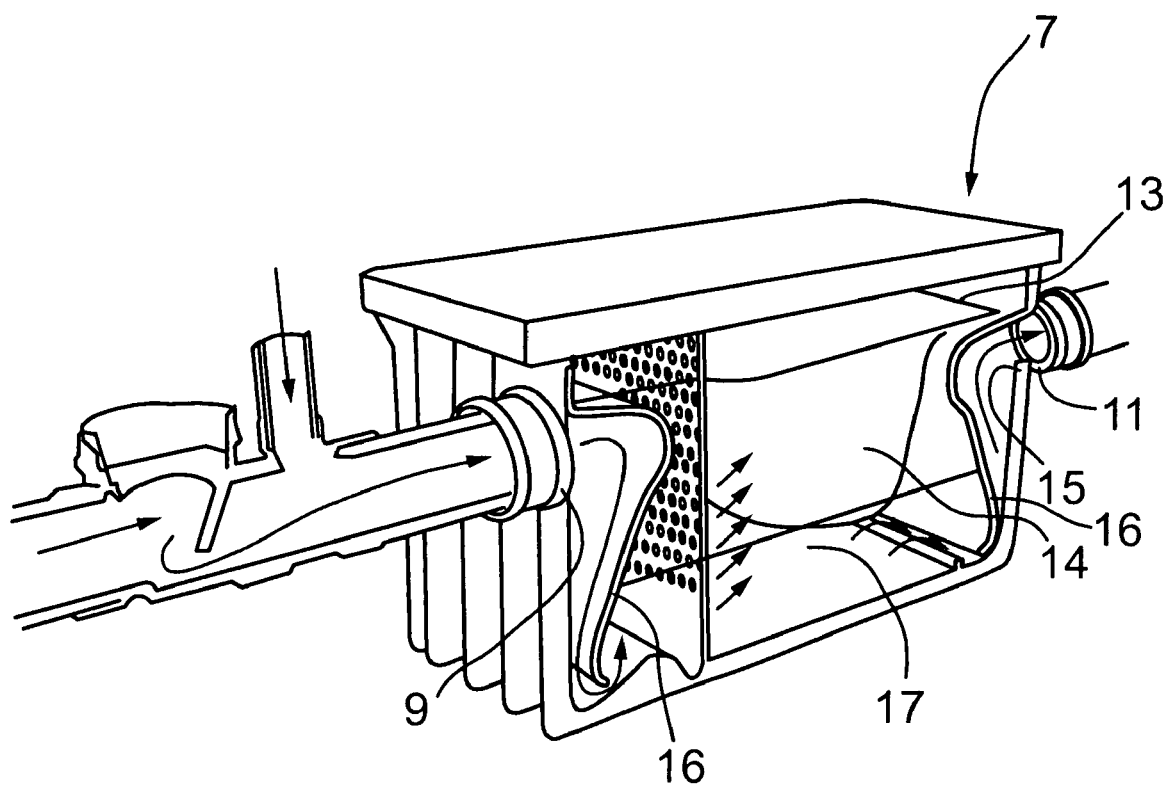
FIG. 2 is a graphic illustration of an example grease interceptor with which the sensing system of FIG. 1 may be utilized.

Referring to FIG. 2, the tank 7 has an inlet 9 and an outlet 11. The upper lever 13 of grease 14 will typically start to form at about the level of the bottom 15 of the outlet 11 as liquid 17 will initially sit in the tank 7 up to this level. The grease 14 may move up and down somewhat as effluent enters and leaves the tank 7. For example, in restaurant applications effluent will often enter the tank 7 in cycles from one or more dishwashers, not shown. One such cycle is shown in FIG. 2 such that the upper level of grease 13 has risen with the incoming effluent above the level of the bottom 15 of the outlet 11. Baffles 16 assist in keeping the inlet 9 and outlet 11 free of grease 14 as the incoming and outgoing effluent wash the baffles 16. As an example, but without limitation, the tank 7 could be one such as the tank sold by Canplas of Barrie, Canada under the trademark Endura Sentry as shown in FIG. or any other grease interceptor.

Referring again to FIG. 1, the communication between the sensor 3 and the remote unit 5 is preferably wirelessly as represented by arrow 17. In the embodiment shown in the FIGS 433 MHz one way radio frequency communication has been used; however, other forms of communication can be used. For some features of the sensor, the communication could also be a wired connection or utilize transceivers for two way communication. An example of two way communication will be described later herein.

Figure 3:
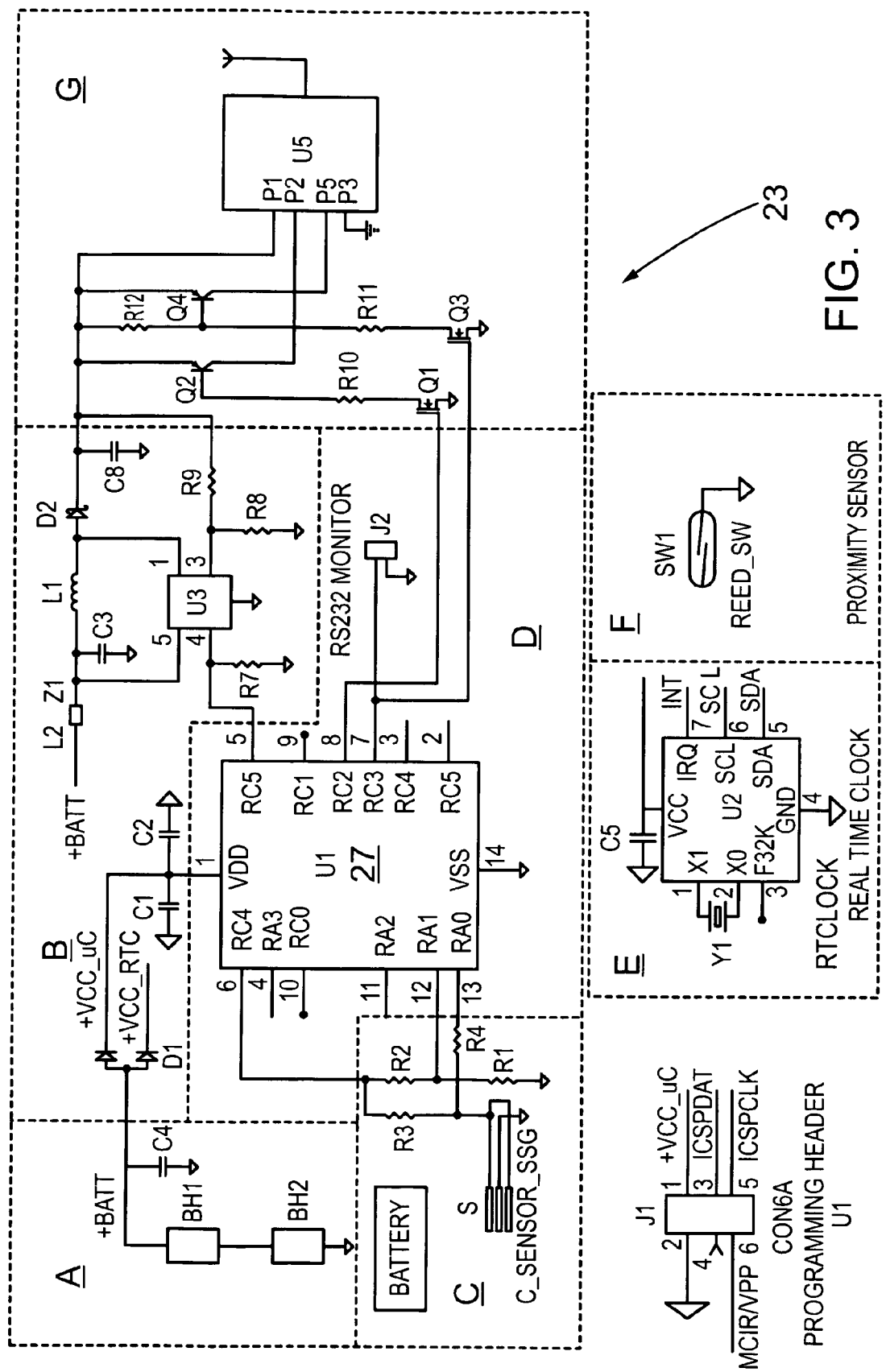
FIG. 3 is a schematic diagram with block overlay of example embodiment of sensor circuitry for an example embodiment of a sensor for use in the system of FIG. 1.

Referring to FIG. 3, the sensor 3 has sensing circuitry 23 comprising battery block A, power conditioning circuit (buck-boost configuration) B, grease sensor block C, microcontroller block D, real time clock block E, proximity sensor block F, and radio frequency wireless transmitter G.

The battery block A has two AA battery holders BH1, BH2 for AA batteries, not shown, but similar to the AA batteries shown in FIGS. for the remote unit discussed later below; however, less or more batteries, and batteries of a different type, can be used subject to any consequent modifications to the sensor 3 to take this into account. A diode D1 is connected to the positive terminal to isolate two branches of the circuit, for example, to provide for noise immunity.

Power conditioning circuit B has a buck-boost configuration that converts the battery voltage +BATT to a higher voltage, typical in the 8V range. The circuit B can have enable capabilities in order to conserve power when not in use.

The sensing circuitry 23 is provided on a single multilayer printed circuit board. This provides for a highly reliable sensor that is not subject to faults caused by wear and tear at probe interconnections as can occur in existing capacitive probe systems.

Grease sensor block C has a capacitive probe S.

Example component values for the circuit elements in FIG. 3 are:

C1, C2, C3, C5 22 uF; C4 0.1 uF; C8 10 uF; R1 10 Kohm; R2, R10, R11, R12 4.7 Kohm; R3 3 Mohm; R4 100 ohm; R7 10 Kohm; R8 182 Kohm; R9 1 Mohm; L1 4.6 uH.

Example components suitable for the functions to be carried out herein are:

U1 PIC16F616 14-Pin Flash-Based, 8-Bit CMOS Microcontrollers—Apex Microtechnology; U2 M41T0/80 SERIAL REAL-TIME CLOCK—ST Microelectronics where 80 represents supply voltage and write protection voltage for example 80=Vcc of 2.0 to 5.5 v; U3 TPS61041 28-V, 250-mA Switch Boost Converter in SOT-23 for LCD and White LED Application—Texas Instruments; U5 CM56 Wireless RF Transmitter of Alutron Modules Inc. of Aurora, Canada. Alternate transmitters could be used such as an SK-919TD1S-UP which is widely available. Separate receivers can include for example a SK-910R receiver. These components are provided by Seco-Larm: http://www.seco-larm.com/RFCat.htm.

The above components and component values can be replaced by other components and components of other values to provide similar functionality.

Figure 4:
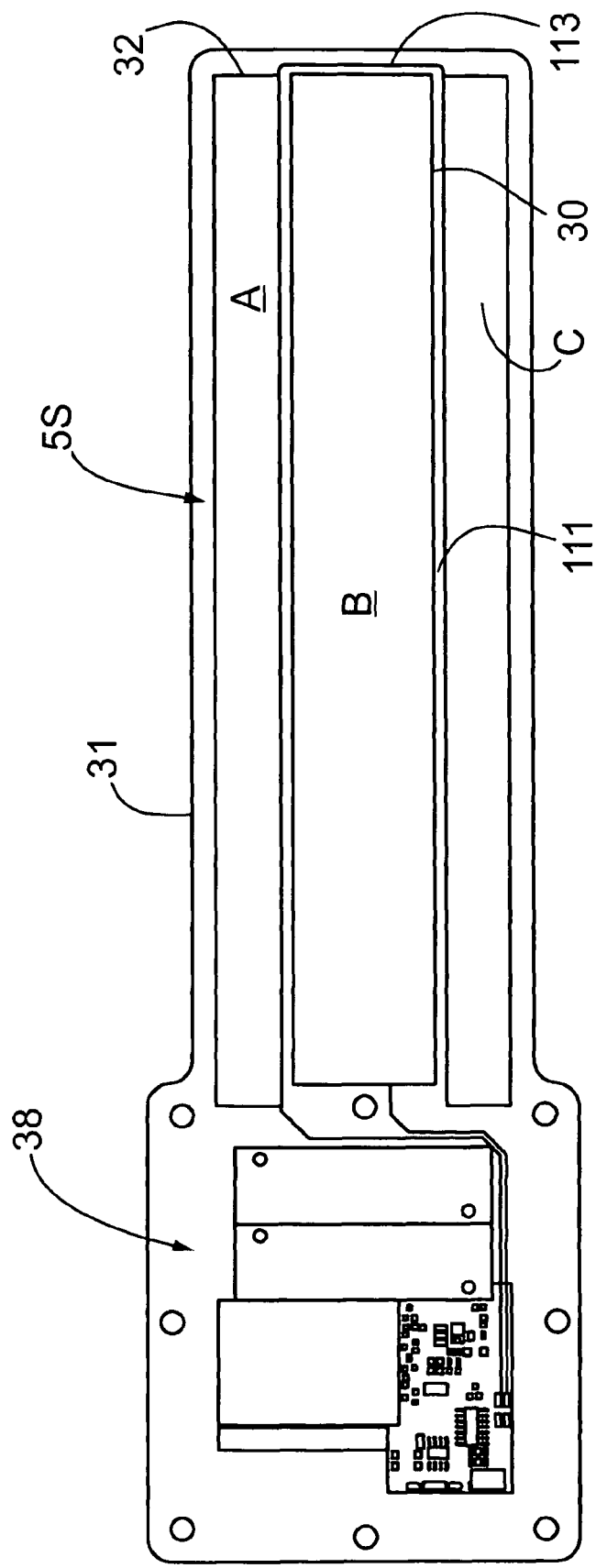
FIG. 4 is a graphic illustration of a printed circuit board layer of the sensor of FIG. 3, FIGS. 5 through 10 are various views of the sensor of FIG. 3 and components thereof.
Figure 5:
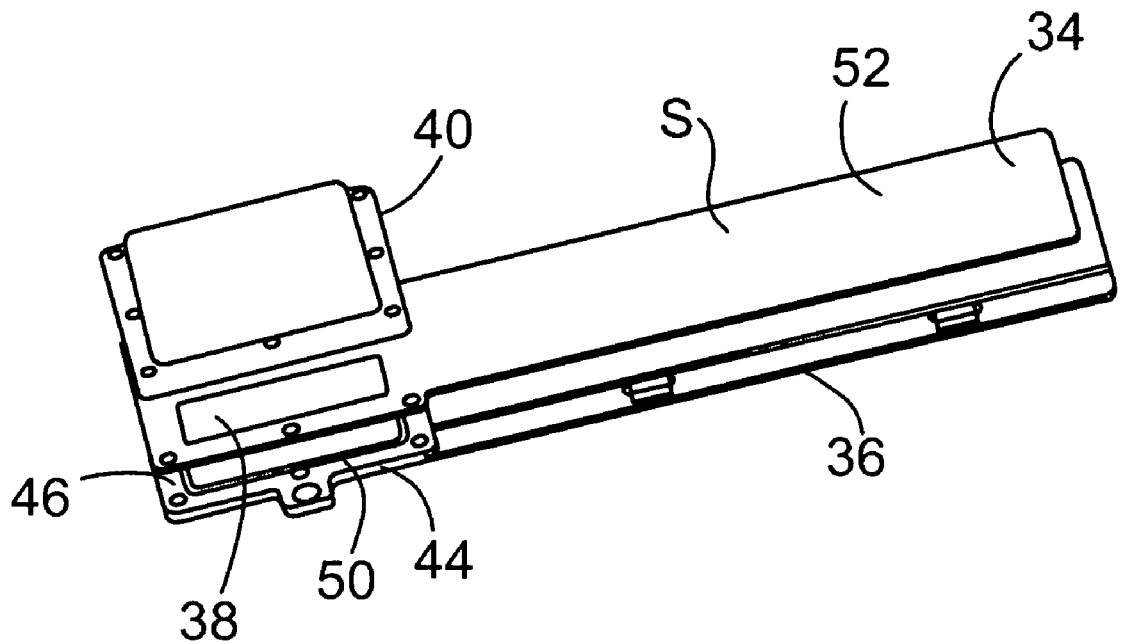
Figure 6:
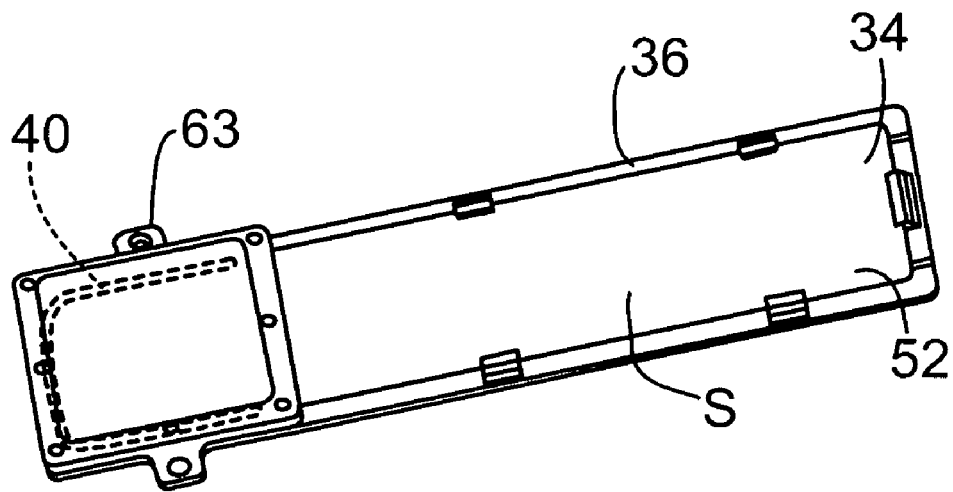
Figure 7:
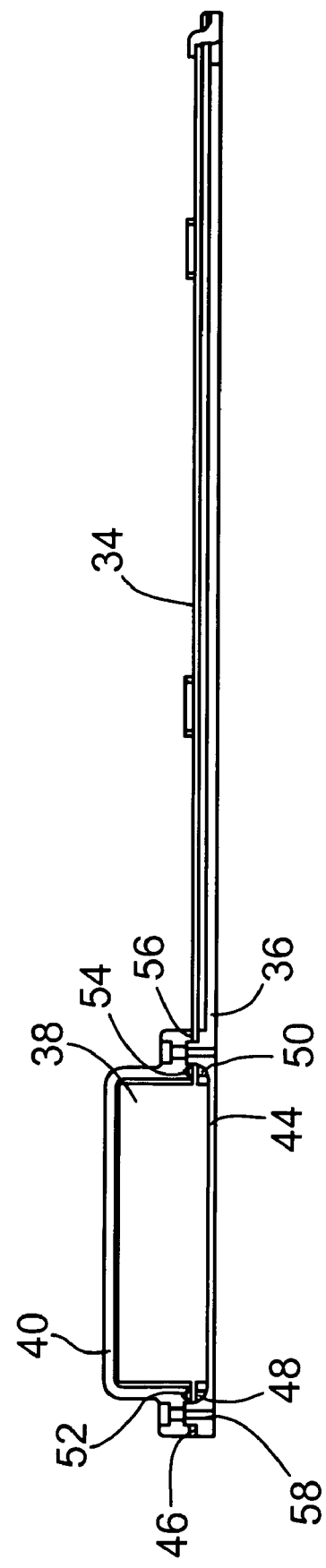
Figure 8:
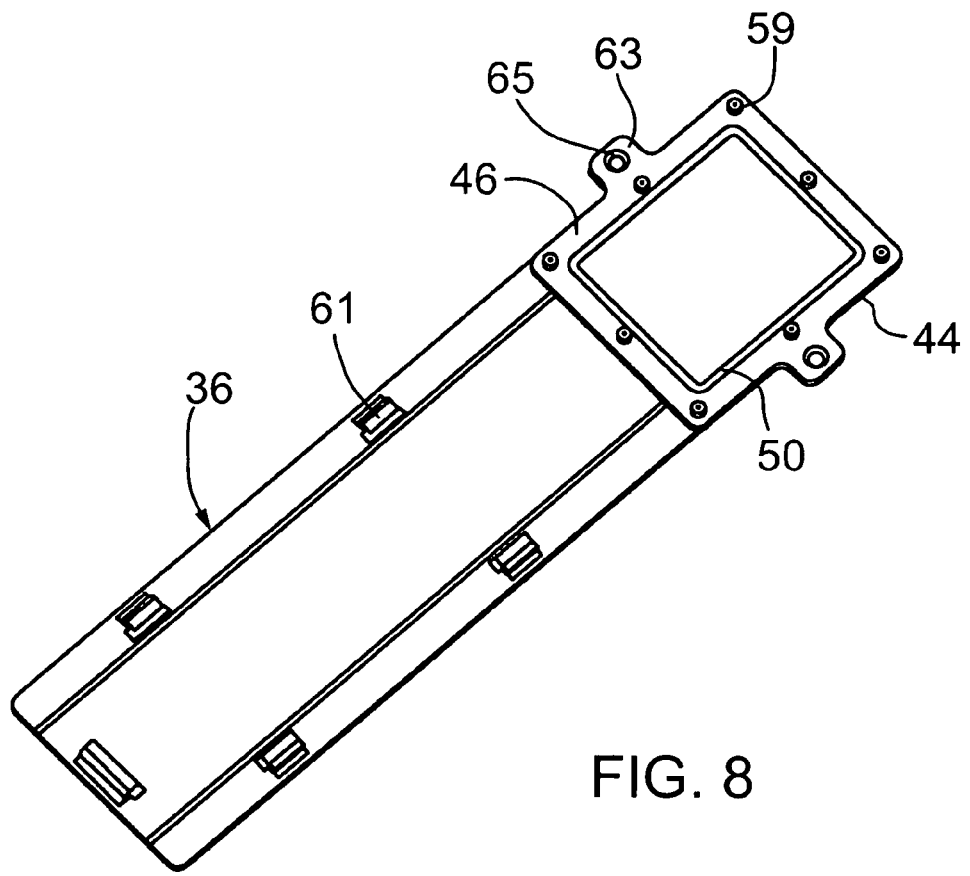
Figure 9:
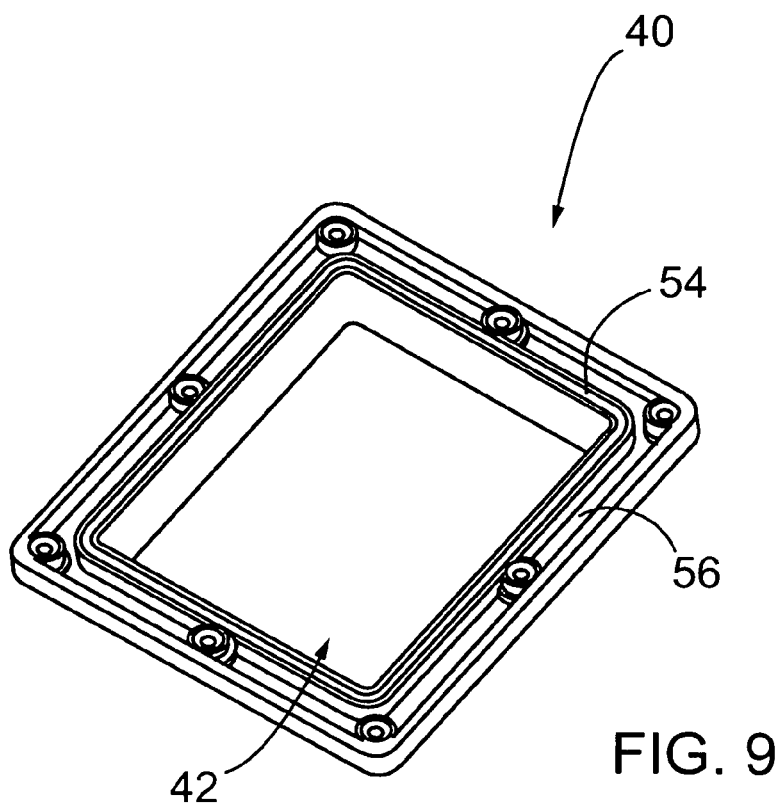
Figure 10:
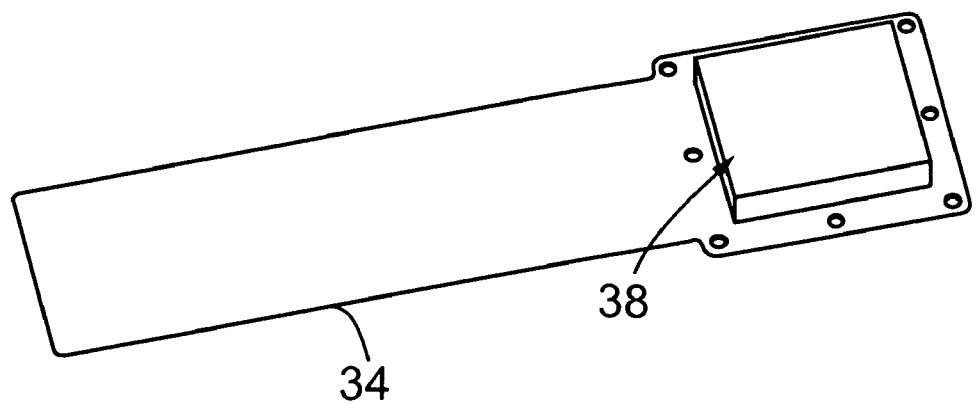
Figure 11:
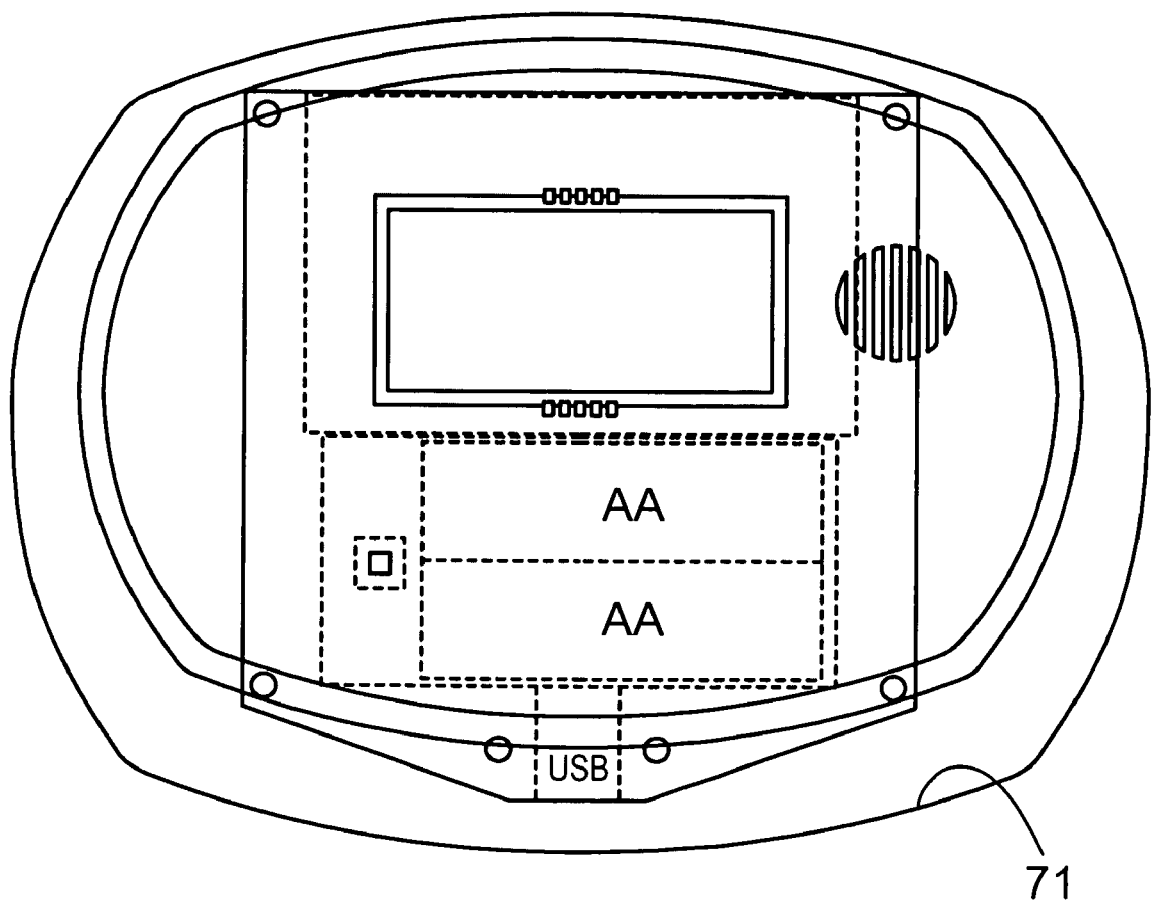
FIGS. 11 through 15 are various views of an example embodiment of a remote unit of the system of FIG. 1, FIG. 16 (including FIGS. 16A, 16B, 16C) and FIG. 17 (including FIGS. 17A, 17B, 17C) are schematic diagrams of example embodiments of circuitry for the remote unit of FIGS. 11 through 15.
Figure 12:
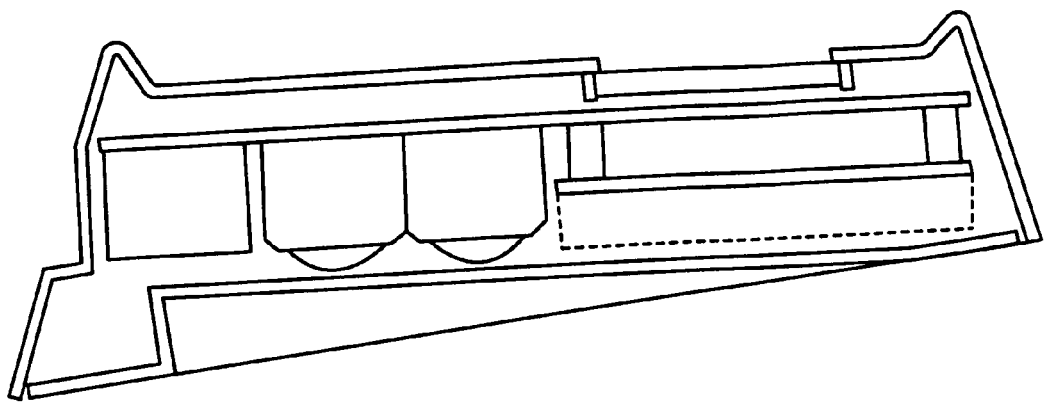
Figure 13:
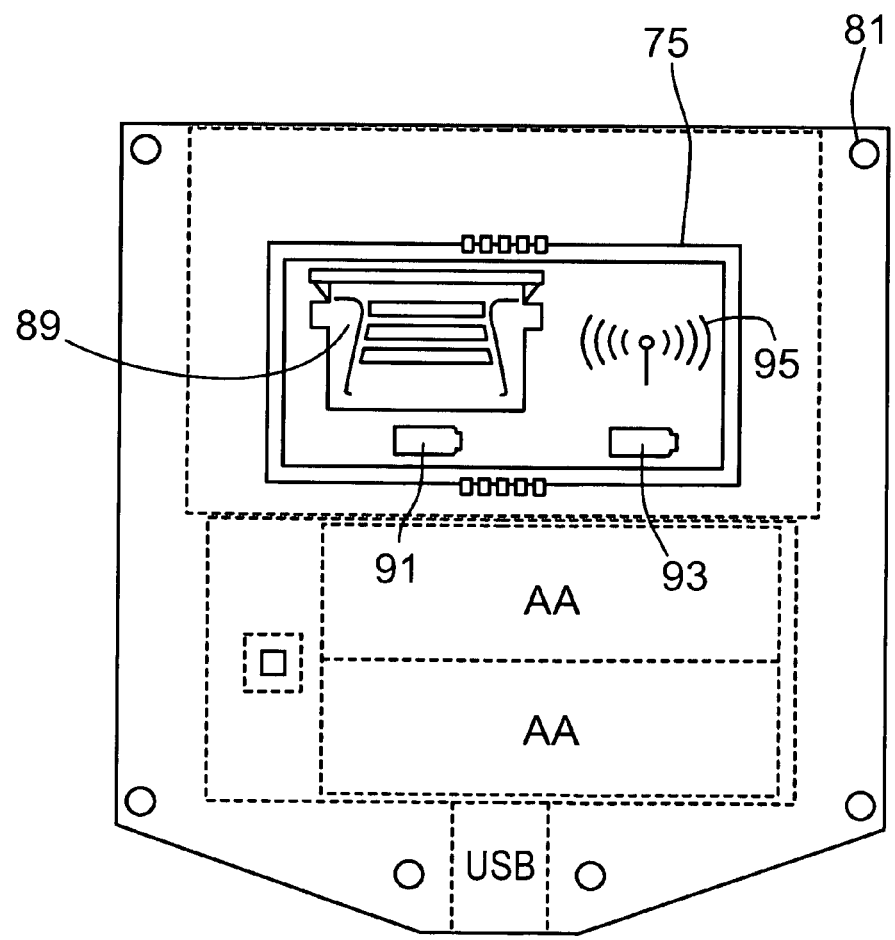
Figure 15:
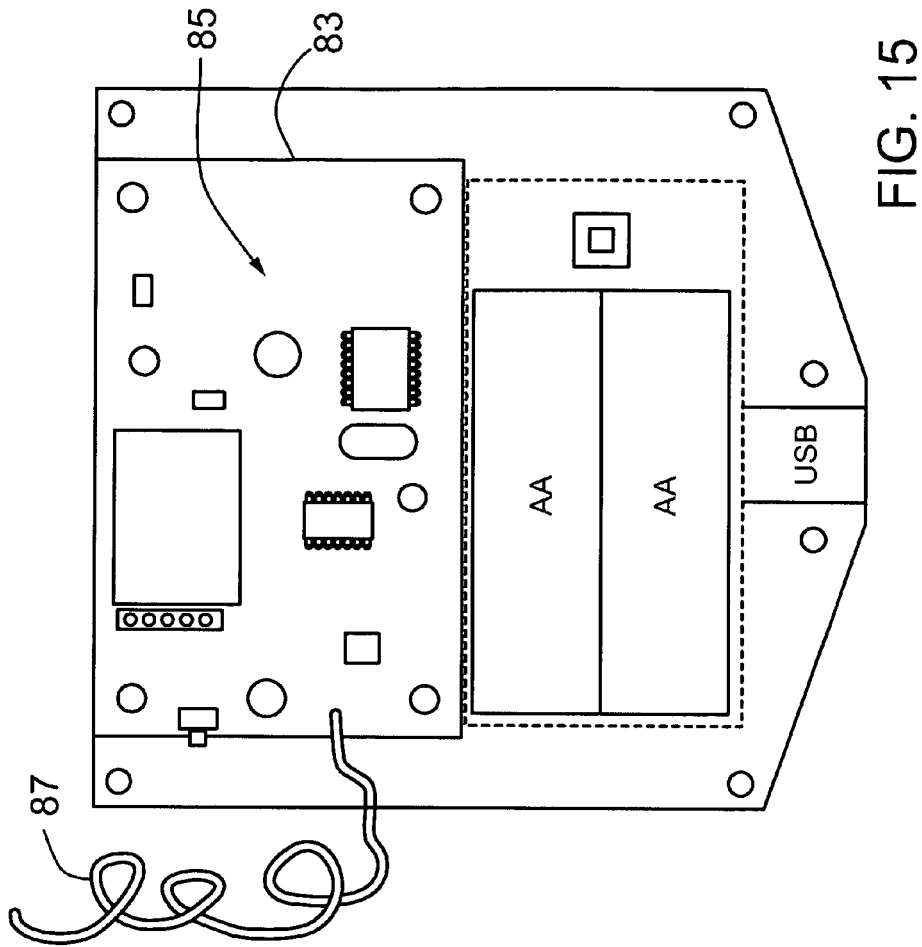
Figure 14:
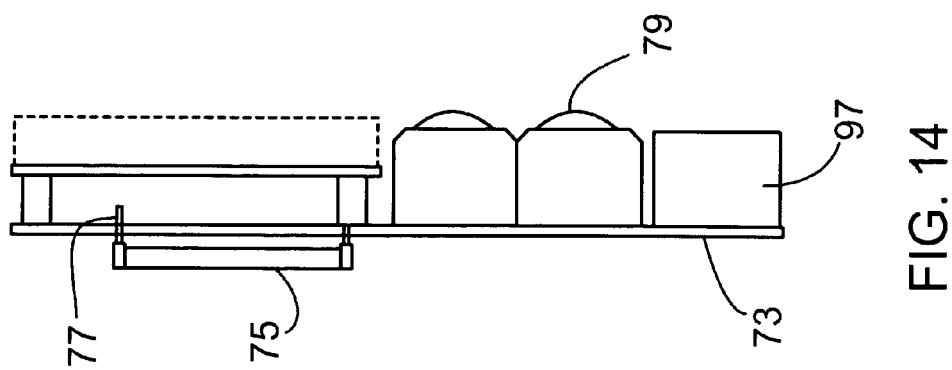

Referring to FIG. 4, the probe S can be implemented as a multilayer printed circuit board (34 see description of FIGS. 5-10 below), with one electrode 30 of copper on a first printed circuit board substrate layer 31, side by side with a second electrode 32 of copper in the same plane. The copper electrodes 30, 32 are laid or etched in the same manner as other printed circuit board traces. As is known, other materials can be used for the traces, such as for example conductive ink. The traces from the electrodes 30, 32 are then connected through suitable through board connections to traces for connection to external components using known techniques, preferably surface mount methods. External components can include for example, integrated circuits and discrete components such as discrete resistors, capacitors, and inductors.

It is noted that while the sensing circuitry other than the probe electrodes are shown in FIG. 4 on one side of substrate 31, the electrodes 30. 32 in the embodiment being described are on the opposite side of substrate 31 from the remainder of the sensing circuitry 38.

Embodiments may provide the electrodes 30, 32 are on the same surface as the sensing circuitry 38; however, it has been found to be preferable to provide the sensing circuitry 38 and the electrodes 30, 32 on different surfaces, particularly in multilayer printed circuit board embodiments. Embodiments may also provide the sensing circuitry 38 separate from a multilayer printed circuitry board, connected for example though input and output wires, not shown. Thus, the multilayer printed circuit board may form the probe, while the sensing circuitry 38 is provided as part of a separate assembly connected to the probe for driving and reading the probe.

A subsequent printed circuit board substrate layer can be laminated to electrode bearing surface of the first substrate layer to encapsulate the electrodes. The external components will then protrude from the opposing surface of the first substrate layer. The combination of a printed circuit board and external components is ordinarily referred to as a printed circuit board assembly. Multilayer printed circuit boards together with associated assembled components are multilayer printed circuit board assemblies.

The printed circuit board substrate material is standard, typically formed from a polymer resin. FR-4 was used for the particular example embodiments described in detail herein; however, other resins may be appropriate for given environmental conditions to be encountered in a particular application for the sensor 3 such as for example FR-2; composite epoxy material CEM-1, 5; polyimide; GETEK; BY-epoxy; cyanate Ester; or PTFE. It is recognized that a flexible printed circuit board material could be used such as Pyralux for some embodiments provided the material is rigidly held for consistent accuracy. The board substrate material is non-hygroscopic, impervious to corrosion by the contents of the tank 7, and able to withstand temperatures over hundred degrees Celsius, which is a typical upper limit internal to the tank 7; although, higher temperatures may be encountered. For embodiments used in applications under different environmental conditions the applicability of any particular substrate material may require review.

Multilayer printed circuit boards are typically formed by laminating together individual substrate layers. Lamination is typically performed by pressing the laying together and heating them to bond one layer to the next. Surprisingly it has been found that the lamination of PCB layers provides sufficient protection in many hostile environments for an internal layer such as the layer carrying the electrodes as described herein. Although a thin external coat of additional material may be used to provide additional protection, the laminated printed circuit board layers can provide sufficient protection for many applications.

Manufacturing techniques ordinarily employed in manufacturing printed circuit boards are manufacturing are fairly precise. This provides the additional benefit of low thickness variations within a sensor 3 and high repeatability between sensors, providing predictable sensor 3 output values.

It is to be noted that a multilayer printed circuit board is not required for all embodiments described herein. The electrodes can be sealed using many other techniques, such as the deposition of a sealing material, or the sealing of a rigid cover to the printed circuit board substrate carrying the electrodes. Where the sensor 3 is to be directional sensing through the substrate carrying the electrodes then the tolerances on the sealing material are quite loose provided the sealing material has sufficiently low capacitance to maintain the directional nature of the sensor 3.

The capacitance of the probe S as configured in the FIGS. provides a capacitance range between 30-10000 pF at room temperature when in contact with grease and water which is acceptable for the outlined use in tank 7. Other capacitance ranges can be selected for desired applications. The range of capacitance between the electrodes with different materials to be sensed must be sufficient to allow the sensor 3 to distinguish between the materials. In the above example, the lower capacitance value occurs when the probe S is 100% submerged in grease and the upper capacitance value occurs when the probe S is completely submerged in water. A combination of grease and water against the probe S will provide capacitance values between the upper and lower range depending on the relative proportions of grease and water in contact with the probe S. The thickness of printed circuit board substrate material on which the copper 30, 32 is laid or etched has been selected to be 5 thousandths of an inch. Further details of the probe S are discussed later below. The dielectric constant of the printed circuit board substrate material will typically be about the same as grease when compared to the dielectric constant of water. A material having a different dielectric constant may be used; however, the thickness of the material may require corresponding adjustment. Air typically has a dielectric constant around 1; grease around 2.5, resins used in printed circuit board materials around 8 and water around 80-85.

The microcontroller block D controls the power conditioning block B. The power conditioning block B can be implemented, for example, using an integrated SMPS chip TPS61041 from Texas Instruments™ and auxiliary circuitry L1, D2 and resistors/capacitors.

Figure 21:
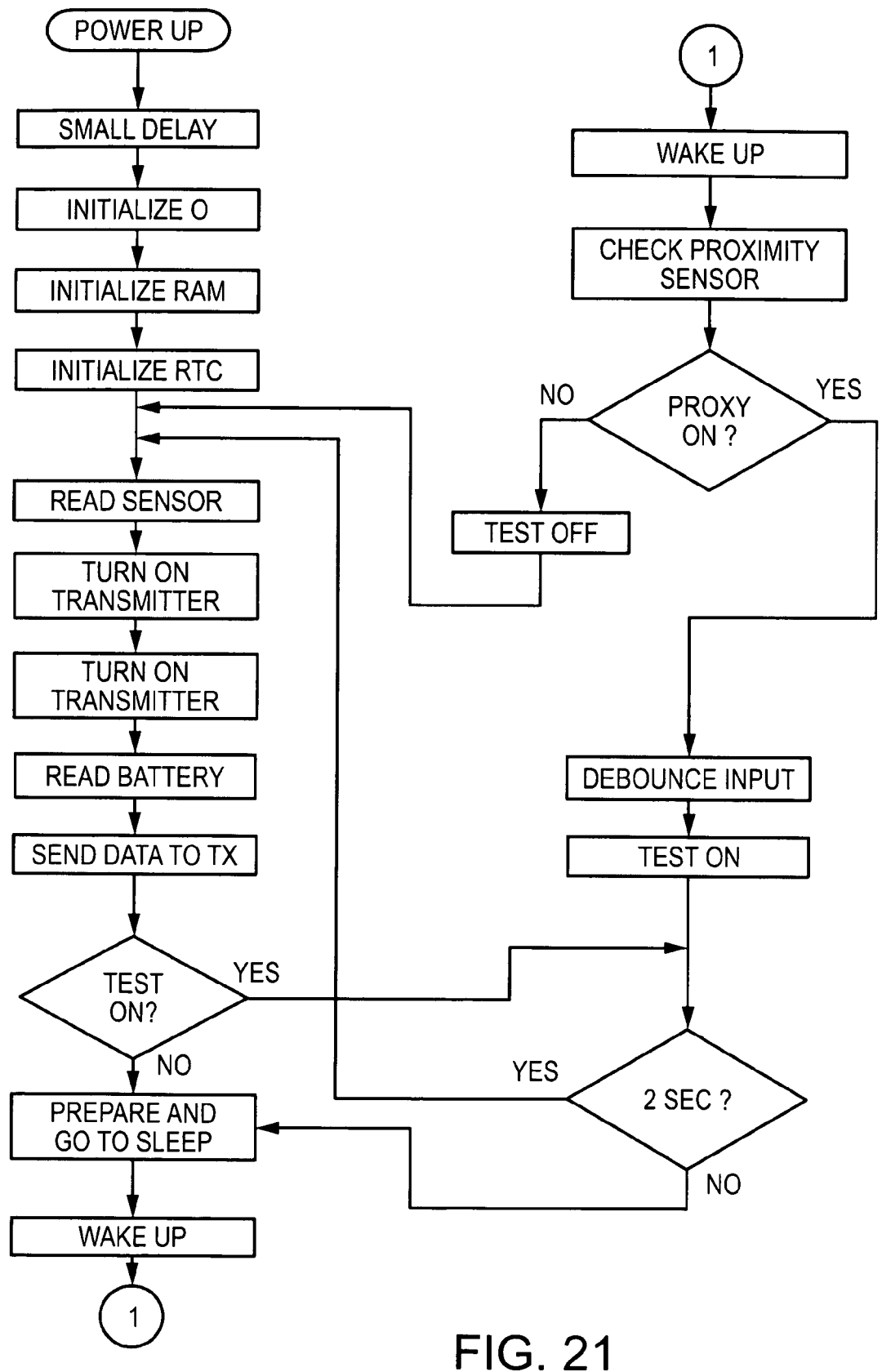
FIG. 21 is a flow diagram of an example program within the sensor of FIG. 3 to control operation of the sensor.

Referring to FIG. 3, for the sensor 3 and to other FIGS for the remote unit 5 (to be described further later below), a microcontroller in the remote unit 5 and microcontroller 27 in the sensor store respective programs to control the functions described herein and shown in FIG. 21. The microcontroller 27 initiates a reading from the probe S by sending a pulse as described later below. The reading is initiated when real time clock E sends a pre-programmed interrupt to the microcontroller 27. The microcontroller 27 is woken from sleep by the real-time clock E at pre-determined intervals which could be, for example, from one second to a couple of hours. Longer intervals will result in longer battery life. The data that is read from the probe S is quantified and bundled with battery level data and sent out by the microcontroller 27 to the transmitter block G, through transistors Q1, Q2, Q3, Q4 and associated bias resistors. Real time clock block E keeps time for synchronization with the remote unit 5. The clock E wakes the microcontroller 27 from low power sleep mode as mentioned above. A precision of 10 mS to the hour or better has been found to provide adequate synchronization with the remote unit 5. Other synchronization methods could be employed to ensure proper synchronization between the sensor 3 and the remote unit 5, for example, to maintain proper time stamping. The proximity sensor block F senses a finger to trigger the sensor circuitry 23 to enter in a pairing session with its counterpart remote unit 5 so that a remote unit 5 receives intended communication from a desired sensor 3 or sensors 3. Use of a proximity sensor F allows initiation of pairing without having to open up the sensor 3 from its own water tight plastic enclosure. The sensor F is a reed relay type or a hall sensor or similar switching device. The radio transmitter G operates, for example, in the ISM band at 433 MHz. It sends the sensed information and battery information from the sensor 3 wirelessly at radio frequencies to the remote unit 5.

Batteries will typically be provided be inserted into the remote unit 5 and sensor 3 so that the unit 5 and sensor 3 can be paired and tested prior to shipping to a customer. Techniques for pairing devices for wireless communication are well known. After pairing the battery can be removed from the remote unit 5.

The sensor 3 will be sealed before or after pairing with the battery inserted. When the battery is inserted in the sensor 3, the sensor 3 will automatically enter into an operation mode to take readings and transmit signals to the remote unit 5 as otherwise described herein.

The sensor 3 is also provided with a ship mode. In the ship mode transmissions from the sensor 3 are silenced. Also, the sensor 3 stops driving the capacitor and sensing signals having a characteristic dependent on the capacitance between the electrodes. Before the remote unit 5 and the sensor 3 are installed it is unnecessary for the sensor 3 to operate in the operation mode. In some circumstances it is forbidden to do so. For example, devices travelling by air are prohibited from transmitting RF wireless signals.

The sensor 3 can be provided with a further manual input mechanism such as for example a button or further proximity sensor, not shown, to put the sensor 3 into ship mode and to bring the sensor out of ship mode into operation mode. Such further manual input mechanism may add cost and complexity to the sensor 3 and possibly introduce a point of sealing failure for the sensor 3. A wireless method of placing the sensor 3 in ship mode will be described later herein.

Referring to FIGS. 5-10, multilayer sensor printed circuit board 34 (incorporating probe board 31) is mounted to a supporting back 36 and the sensing circuitry 38 other than the probes S are covered by a cover 40. The cover 40 has a hollow 42 (see FIG. 9) to receive the sensing circuitry 38 other than the probes S. The back 36 has an upper section 44 with a raised rim 46. A groove 48 (see FIG. 7) is provided in the rim 46 to receive an O-ring seal 50. Similarly, the cover 40 has a corresponding groove 52 (see FIG. 7) and seal 54 about a rim 56 of the hollow 42. The cover 40, printed circuit board 34 and back upper section 44 are fixed to one another using screws 58 (see FIG. 7) or other, preferably removable, methods of fixation, such that the cover 40 and upper section 44 seal about the printed circuit board 34. Screw holes 59 (see FIG. 8) on the back 36 are raised to easily locate the proper cover 40 and back 36 alignment and to provide additional purchase for the screws 58. The circuitry 38 inside the cover 40 can be provided with a layer of sealant, not shown, to further protect the circuitry 38 in the event of infiltration. In the FIGS. the components inside the cover 40 are shown in a stylized block representing the underlying printed circuit board 34 and circuitry 38 shown in the other FIGS. An exposed probe section S of the printed circuit board 34 is further held in place by clips 61 on the back 36. The back 36 has mounting flanges 63 with holes 65 for screws, not shown, to mount the sensor 3 to the tank 7.

Referring to FIGS. 1 and 11-17, the remote unit 5 has a housing 71 containing two printed circuit boards 73, 75, 77, a display board 73 having a display 75 and display driver circuitry 77 and to hold the batteries 79, support the other board and allow mounting within the housing, for example, through holes 81, and a receiver board 83 having receiver circuitry 85 and attached antenna 87 for receiving communications from the sensor 3 and interpreting the data for display through an icon 89 representing how full the tank 7 is with grease. The display 75 also shows on further icons 91, 93 the status of the batteries in the sensor 3 and in the remote unit 5 so that the batteries can be changed as necessary.

A remote unit 5 can easily be provided to operate with multiple sensors 3 by consequent modification to the display and logging capabilities. For example, a capacitance sensing circuit, not shown but which could be similar to the proximity sensor described previously for the sensor 3, at the remote unit 5 could operate to sense the capacitance of a human finger through the plastic housing 71 which would allow for the data from different grease sensors 3 to be displayed on the existing single grease level icon 89 on the display 75. If desired, additional icons from additional sensors 3 could be provided on the display 75.

The display 75 also provides an icon 95 representing operation of the wireless functionality based on the receipt of signals from the sensor 3.

A microcontroller 101 located in the receiver board circuitry 85 stores this information for retrieval at a later date through a USB connector 97 which can interface to a portable computer, not shown. This interface permits data logging, enabling on-demand data retrieval. The remote unit 5 maintains a real time clock 103 that is synchronized with the real-time clock E of the sensor 3. Software applications can be provided for the computer to graph grease level and maintenance based on real time clock time stamping and receiver-transmitter synchronization.

Other connections can be provided to interface to a computer for downloading the data, such as for example a wireless transmitter/receiver operating for example over a Bluetooth protocol. The functionality of the remote unit 5 can be provided by a personal computer with a wireless transmitter/receiver programmed to carry out any desired functions described herein.

Degradation of battery voltage can have a negative effect on the performance of any electronic system. Once battery voltage has dropped to a predetermined level, this is sensed by the respective microcontroller 27, 77 and a signal sent to the remote unit 5, or generated by the remote unit 5, to alert the operator that a low battery voltage condition exists. The remote unit 5 may, for example, chirp 5 times per hour (emit an audible alarm) until the affected battery is changed. If the battery is not changed, this occurrence will be recorded in non volatile memory in the microcontroller 103 of the remote unit 5 and kept for retrieval at a later date.

Figure 16:
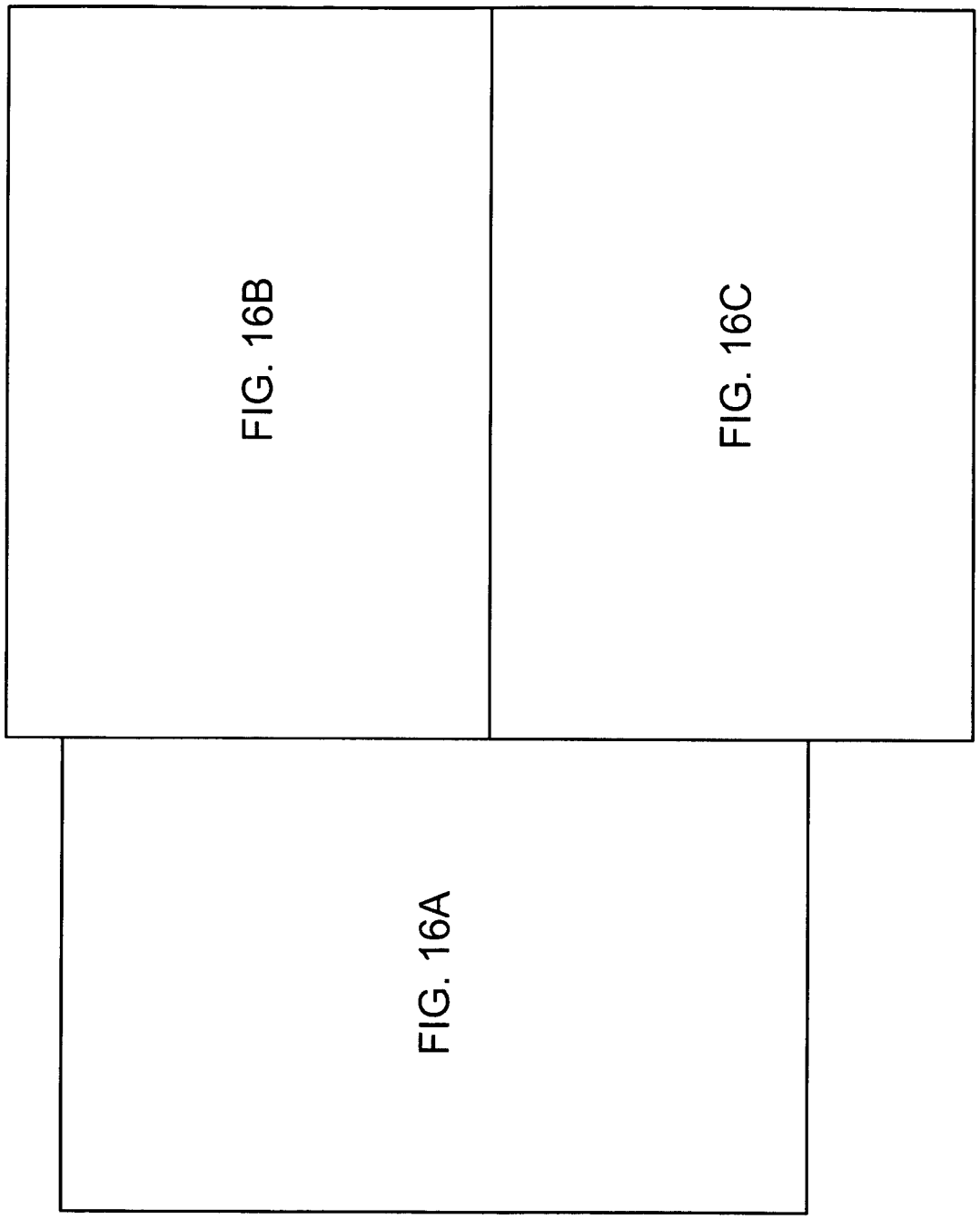
Figure 16A:
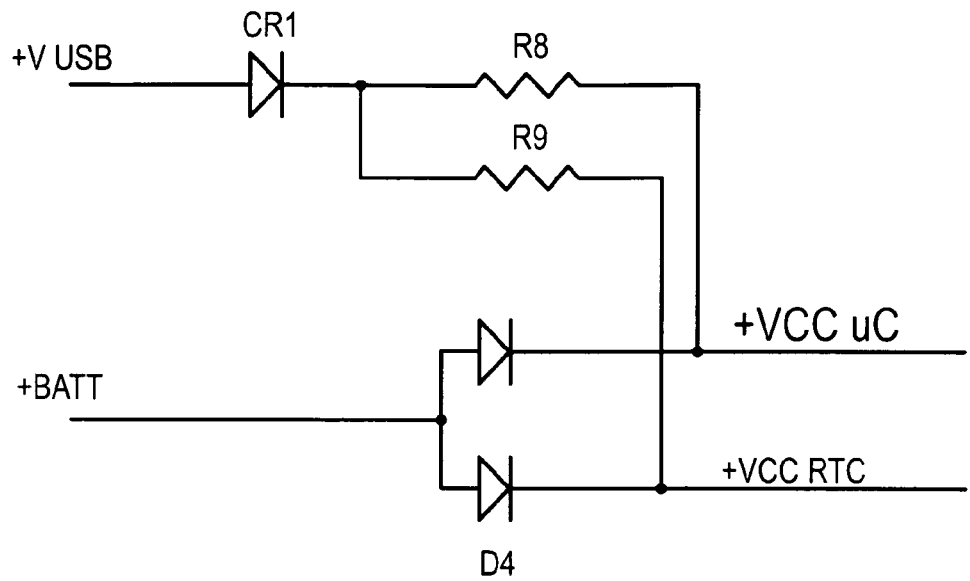
Figure 16A:
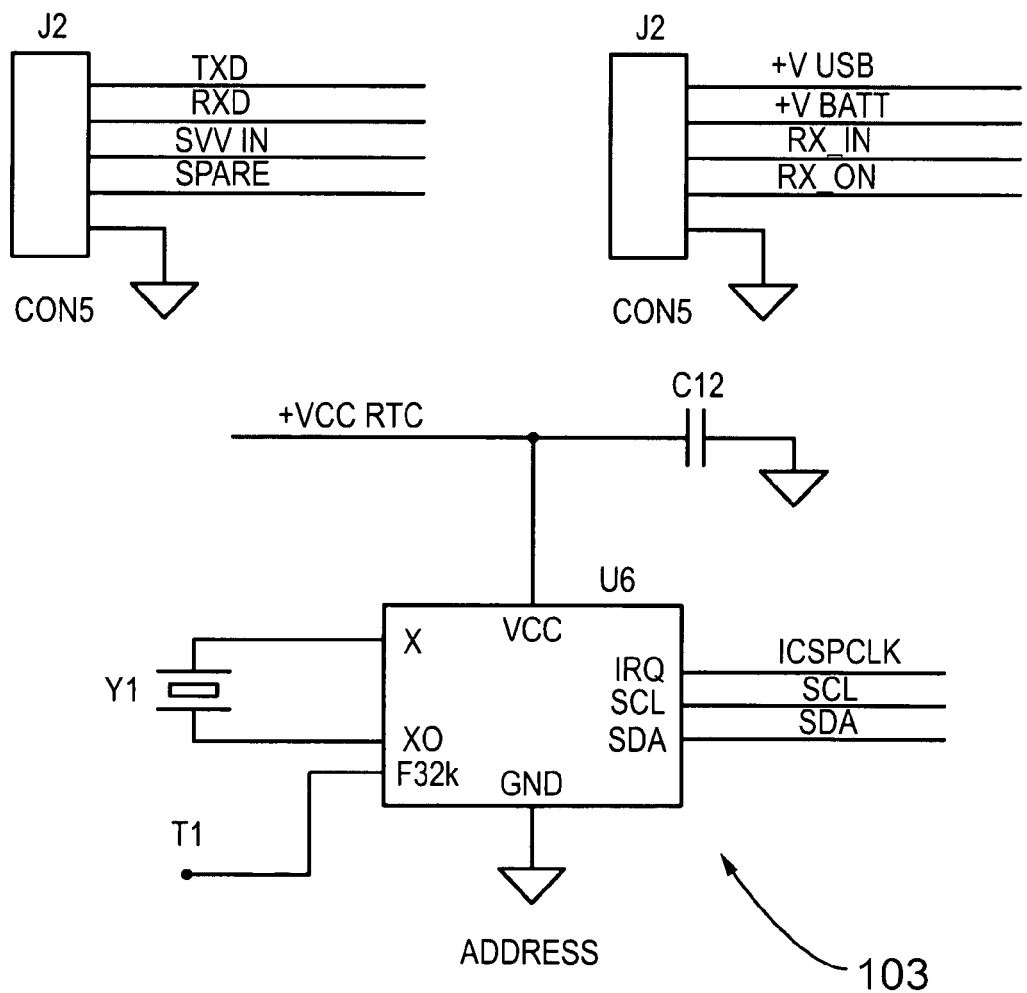
Figure 16B:
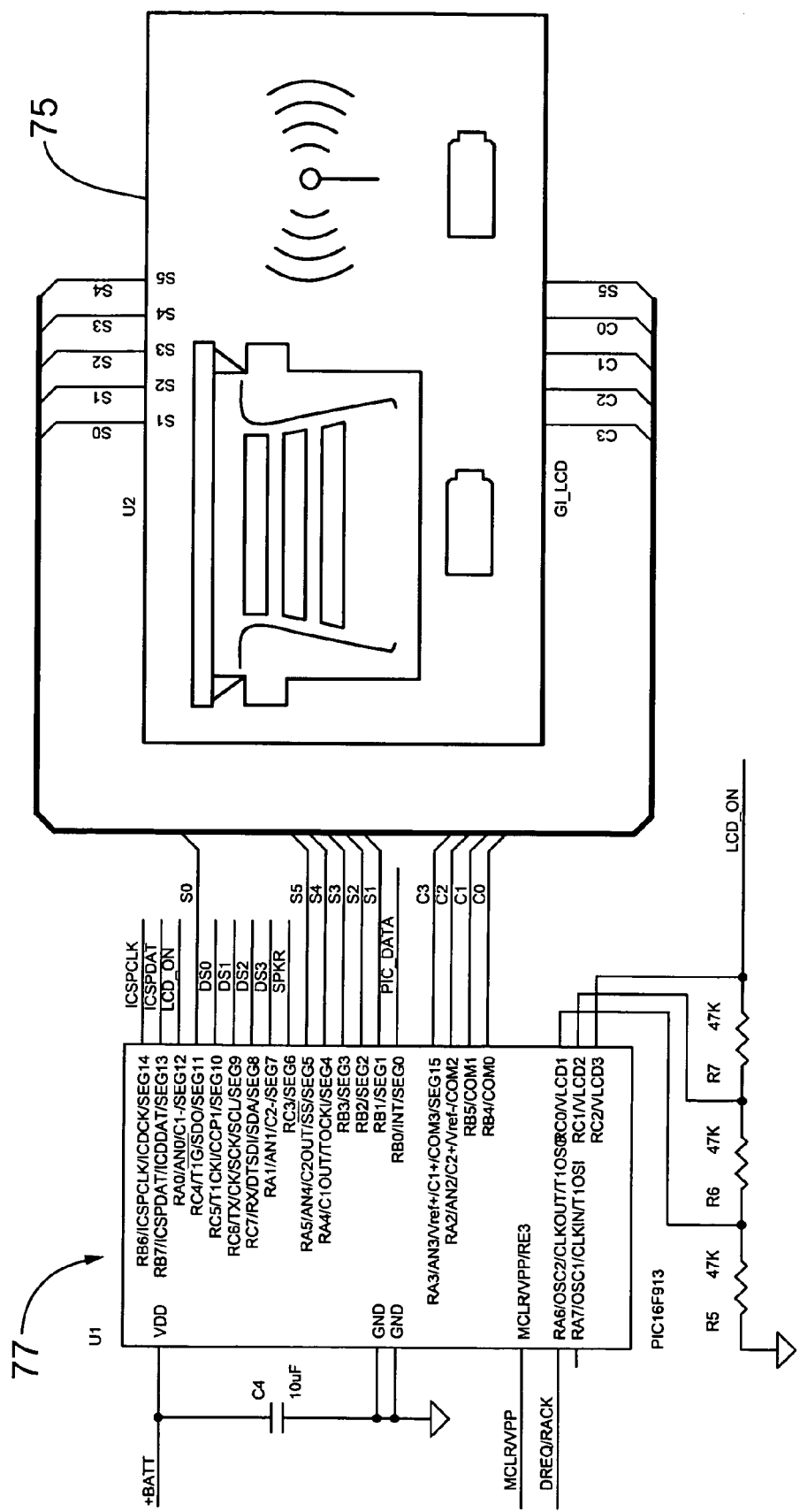
Figure 17A:
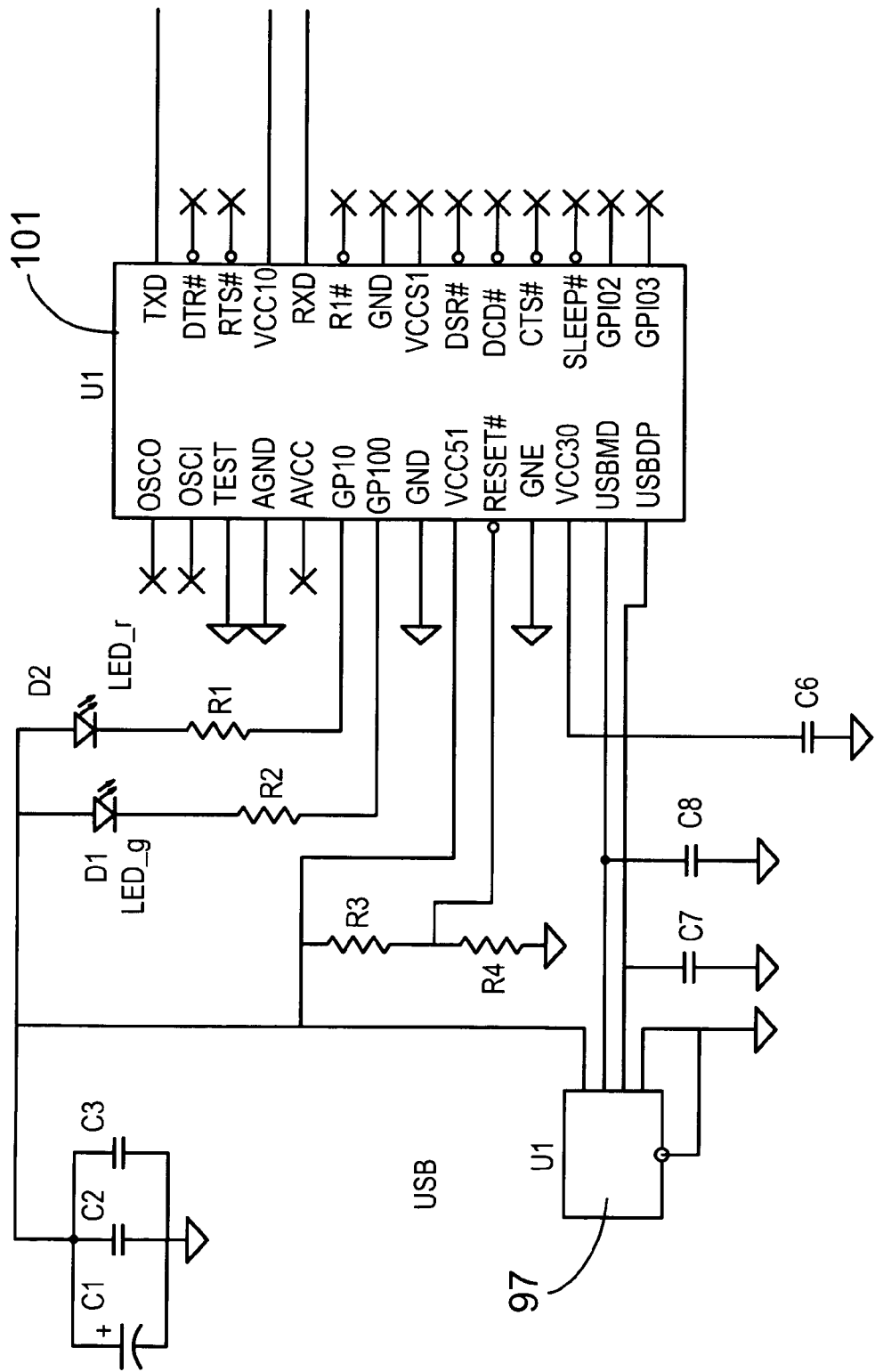
Figure 17B:
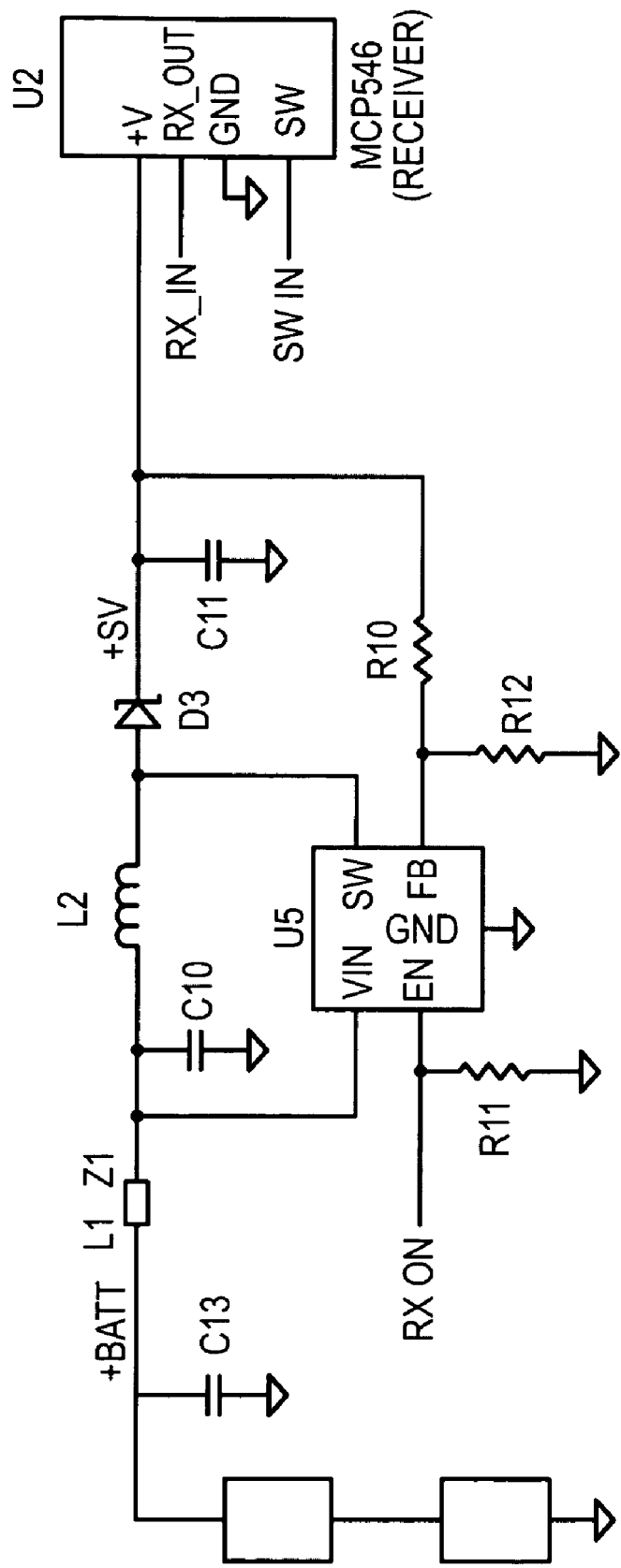
Figure 17C:
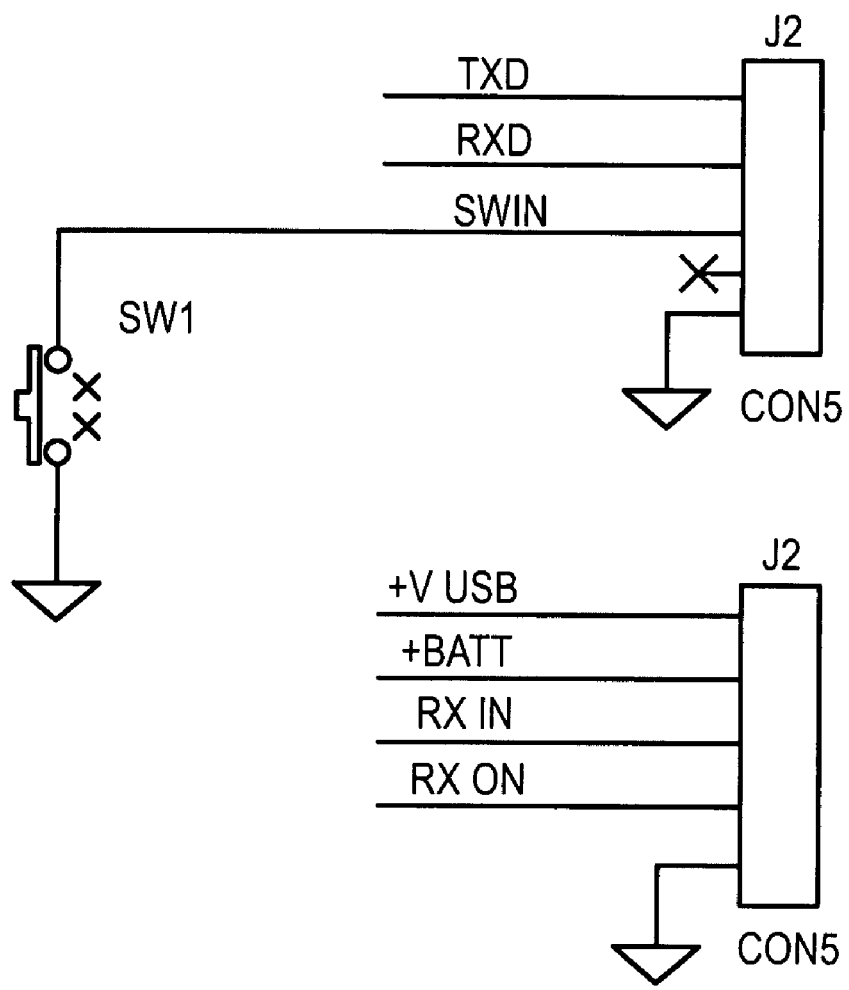

Example component values for the circuit elements in FIGS. 16 and 17 are:

C1, C11 10 uF; C2, C3, C6, C9, C12, C13 0.1 uF; C4, C10 22 uF; C7, C8 47 pF; R1, R2, R8, R9 220 ohm; R3 4 Kohm; R4, R5, R6, R7, R11 10 Kohm; R12 182 Kohm; L2 4.7 uH.

Example components suitable for the functions to be carried out herein are:

U1 FT232R USB UART IC—Future technology Devices International Ltd.; U2 MCP546 wireless receiver available from Alutron Modules Inc.; U3 PIC16F913 28-Pin Flash-Based, 8-Bit CMOS Microcontrollers; U4 24C32/SO EEPROM Serial 32k—ST microelectronics; U5 TPS61041 Switch Boost Converter for LCD and white LED applications—Texas Instruments.

The above components and component values can be replaced by other components and components of other value to provide similar functionality. As just one example R5, R6, R7 acting as a voltage divider could be matched at other values, such as 47 Kohms. Also, a Seco-Larm: http://www.seco-larm.com/RFCat.htm SK-910R receiver may be used as mentioned previously.

Figure 18:
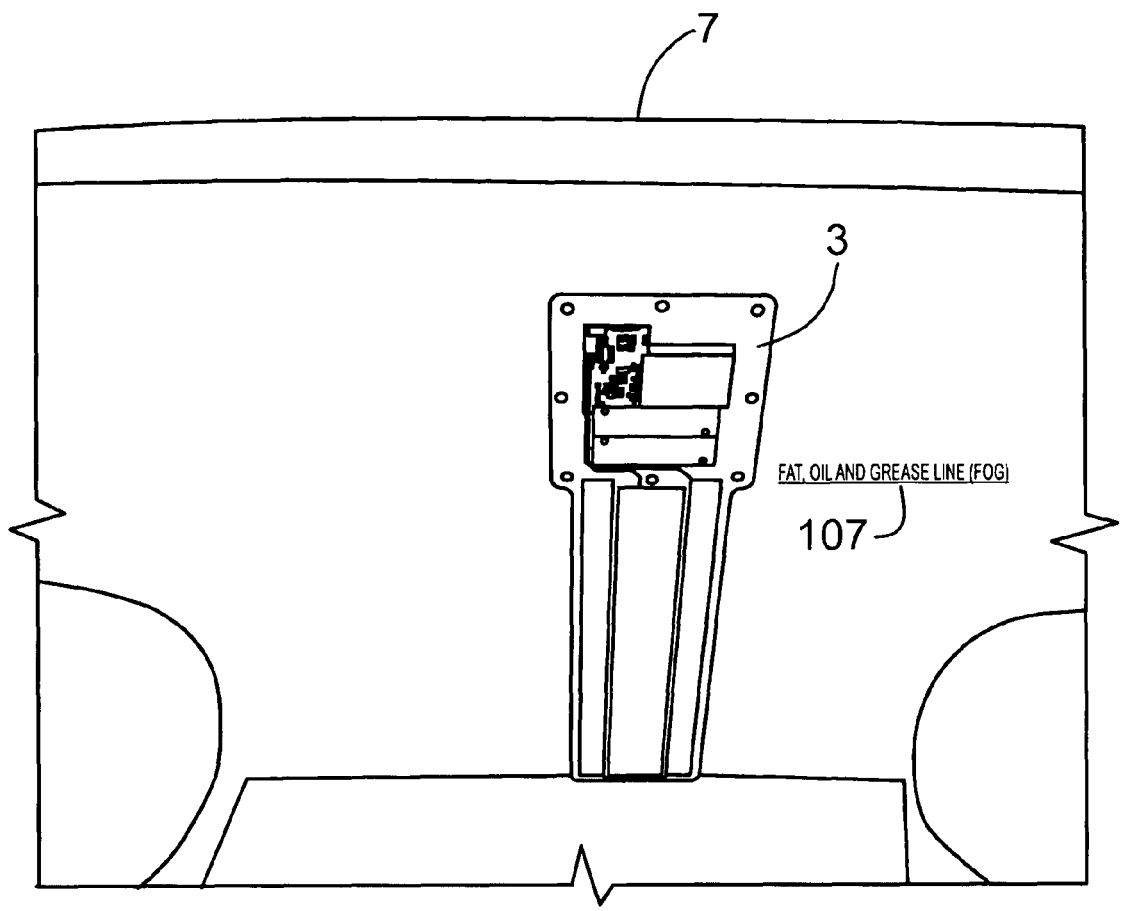
FIG. 18 is a graphic illustration of detailed view of the tank and sensor of FIGS. 1 and 3.

Referring to FIGS. 2 and 18, the grease sensor 3 is installed in the grease interceptor tank 7 as described previously at the location shown in the FIGS. The sensor 3 is positioned in the tank 7 such the top line of the probe S is at the upper level of the liquid and grease also called "the fog" or fat, oil and grease line 107, such "fog" referred to herein as grease. This matches the probe to the tank 7 such that factory calibration of the sensor 3 will take a reading indicative of an empty tank 7 if there is no fat below the line. For a tank 7 of known configuration the remote unit 5 can have a setting stored in memory to convert received sensor readings to specific representations of the grease level.

Where the remote unit 5 is to be configured for use with two tanks 7 having different capacities then the lower level (grease full) may be different on the probe S from one tank 7 to the other. The remote unit 5 can take this into account by converting the sensor 3 reading to a particular grease level for the tank 7. The capacity of the tank 7 with which the sensor 3 is being used can be manually indicated to the remote unit 5, for example, using a manual input interface, such as a DIP switch (an example application of which will be described later below).

Alternatively, the sensor 3 can be programmed to take this into account initially. This may require a two way communication between the remote unit 5 and the sensor 3 using respective transceivers and consequent modification to the programs in memory and additional user input so that one or another tank 7 size can be selected at the remote unit 5 and communicated to the sensor 3 wirelessly. Other embodiments may include automatic sensing between the sensor 3 and the tank 7, such as by way of a particular physical shape into which the sensor 3 is mounted so as to be sensed by the sensor 3 to represent the particular tank 7 for calibration purposes.

The remote unit 5 and sensor 3 may also provide for manual calibration by bringing water up to the empty level for the probe S for a particular tank 7, and zeroing the sensor 3 or remote unit 5 to the reading, and bringing water down to the full level and setting the full level of the sensor 3 or remote unit 5 to the reading. This can be done with the sensor 3 installed in the tank 7, or by using a separate model representing the tank 7 levels.

Referring again to FIG. 4, the probe S is capacitive in nature. Two electrodes of the capacitor provided by layers 30, 32 discussed previously are side by side in the same plane (on an internal layer of the multilayer printed circuit board 34) separated by a gap 111.

As illustrated, the electrodes 30, 32 are made out of three surfaces. One electrode 32 connected to ground is formed of surface A and C connected by link 113 together. The other electrode 30 of the capacitor is surface B. The electrode 30 represents a sense output of the probe S connected to R3 and R4 of FIG. 3, as such it may be referred to herein as the sense electrode. The electrodes 30, 32 are made from 1-ounce laminated copper on standard printed circuit board substrate material. It is to be recognized that the sense electrode 30 and the ground electrode 32 could be interchanged with consequent modification of the connections to ground and the resistors.

The width of A and C are 0.575 inches and the gap between the electrodes is 0.1 inches. The gap 111 is selected to be small enough to allow sufficient capacitance for sensing while being large enough to avoid short circuits as a result of manufacturing tolerances. The width of surface B is 1.25 inches. The length of A and C is 9¼ inches, and the length of B is 9 inches. The dimensions of the electrodes 30, 32 could be altered substantially provided there is sufficient area providing sufficient capacitance and capacitance difference when in proximity to grease and to water. A thin trace of ¼ inch or less may be acceptable. More or less surfaces could be used to make up the electrodes 30, 32.

The electrodes 30, 32 could also have a vertical shape other than straight. For example, a sinusoidal horizontal pattern could be used; however, care may need to be taken to account for the introduction of inductance that may affect the shape of the waveform at the probe S. Such affect may include, for example, ringing. Filters could be used to remove the affect of such inductance, with a possible increase in the complex of the sensing circuit, for example, requiring a digital signal processor (DSP) in addition to the microcontroller 27.

The probe 31 can utilize multiple electrode pairs 30. 32 and sense a signal having characteristics based on the capacitance between each electrode pair 30, 32. The sensed signal can be used to determine if a respective electrode pair 30, 32 is primarily in grease or primarily in water, and the sensor 3 or remote unit 5, or the sensor 3 and remote unit 5 in combination, can be configured to interpret the information from the signal accordingly. An example of such a multiple electrode pair 30, 32 probe will be described later below.

Figure 19:
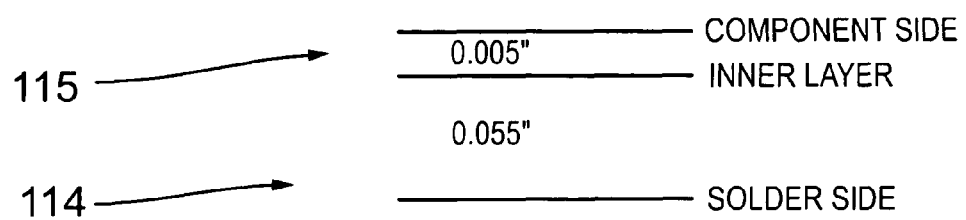
FIG. 19 is a graphic illustration of the relative size of the layers of a multilayer printed circuit board of the example sensor of FIG. 3.

Referring to FIG. 19, layers 114, 115 of the sensor 3 printed circuit board 34 are asymmetric. One board substrate layer 114 is thicker than the other board substrate layer 115 to provide uni-directional sensing through the thinner layer 115 such that the sensor 3 can be mounted up against the tank 7 wall and be unaffected by the tank 7 wall or other objects behind the sensor 3. By providing one layer thicker than another capacitance from external to the printed circuit board is primarily contributed from adjacent the second layer 115.

In the embodiment shown in the FIGS. the component side to the inner layer is the thinner layer 115 and is 0.005 inch thick and the inner layer to the solder side is the thicker layer 114 is at 0.055 inches. The inner layer to solder side thickness renders the sensor insensitive to changes in capacitance from tank 7 to tank 7 and to objects placed behind the sensor 3. It has been found, for example, that a thickness of 55 thousands of an inch makes the permeability through to the electrodes 30, 32 to be high enough that if a metal object is placed on the back of the sensor 3 the effect on the sensor 3 capacitance is practically zero. Using the above thickness the effect has been found to be less than five percent which is within the quantification error of the A/D converter of the microcontroller 27. This reduces sensor 3 dependence on a particular tank 7 so the sensor 3 can be easily adapted to be used with other tanks 7. In many cases, no adaptation will be required. In some cases the sensor 3 may, for example, be made shorter, longer or wider to fit within tanks of alternate depths. Also, calibration may be desired as discussed previously.

By dividing the electrodes 30, 32 into three sections, the electrodes 30, 32 are balanced: one central electrode 30 between two ground half electrodes 32A, 32C. This may provide some protection against undesired stray capacitances. It also decreases the average distance between the central electrode 30 and the half electrodes 32, thus increasing the capacitance. This is particularly helpful when sensing materials having low dielectric constant such as grease or air.

By including the sensing circuitry 38 on the same piece of printed circuit board 34 as the grease probe S, the signal path may also be less susceptible to interference and noise.

Figure 20:
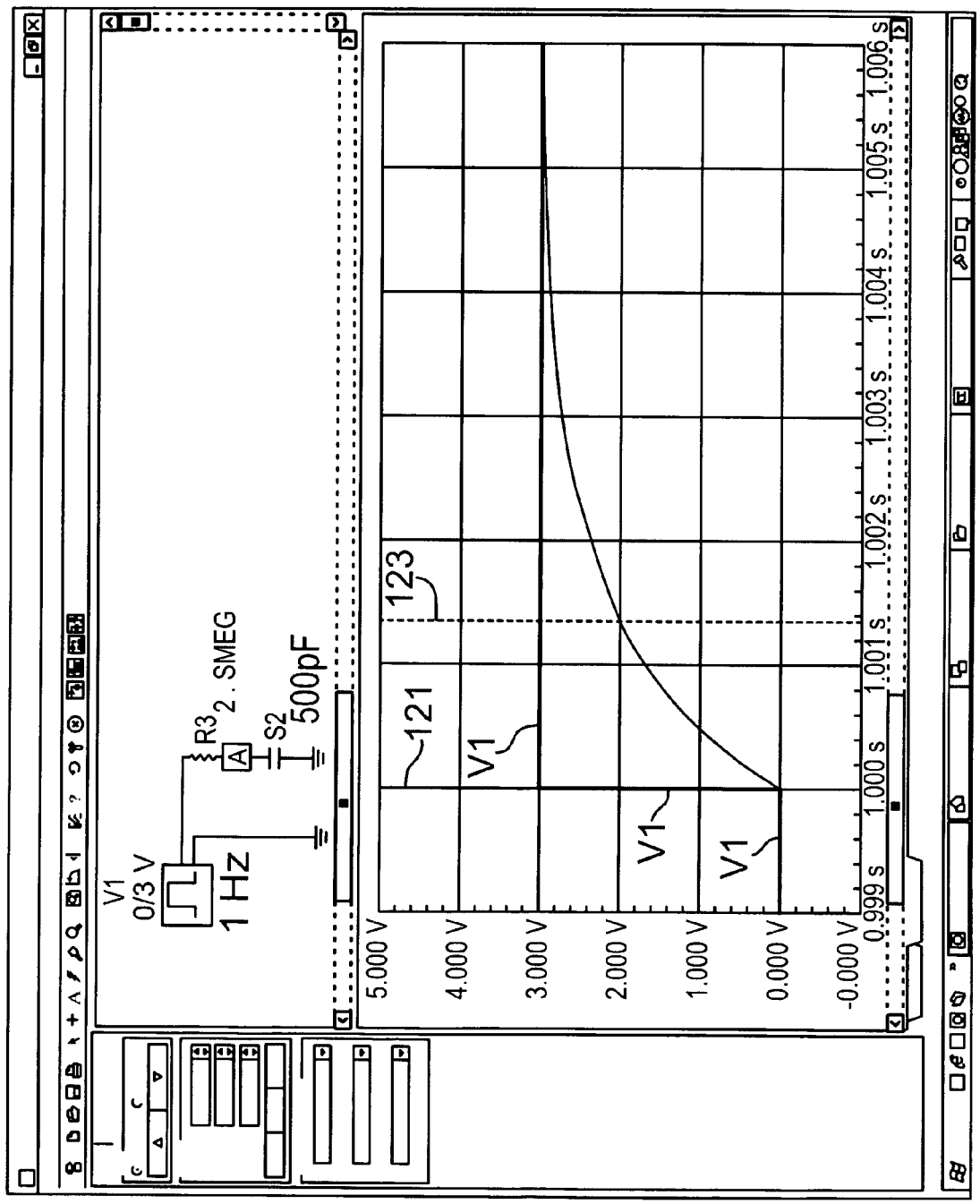
FIG. 20 is a graph representing an input signal pulse to the sensor of FIG. 3, the resulting output, a voltage threshold, and a time interval within which the output signal reaches the threshold as representative of the capacitance of the sensor of FIG. 3.

Referring to FIG. 20, the sensor circuitry 38 drives the probe S and senses the effect relying on the time constant of an RC circuit provided by resistance in the sensing circuitry (R3) and the capacitance in the probe S. Alternative methods of driving and sensing the probe S can be used, such as the affect on the frequency of an oscillating signal. An example of an oscillating signal based method will be described in further detail later herein.

Signal source V1 from the microcontroller 27 charges a capacitor S on the leading edge and top of a pulse. The microcontroller 27 times from the beginning 121 of the pulse until the voltage across the probes reaches a given threshold 123. The microcontroller 27 then converts this time interval to produce an 8-bit result. In order to use the full range of the microcontroller 27 utilized in the embodiment shown in the FIGS. a time interval equivalent to no grease (0% grease, 100% water) against the sensor 3 results in a 0 and all grease (100% grease, 0% water) against the sensor 3 results in a 255.

The pulse can be terminated at any time after the given voltage threshold 123 is reached. The microcontroller 27 can be set to terminate after a given time threshold that is known to be longer than that which would be ordinarily encountered (for example when the grease tank is empty, i.e. full of water).

For example, if the capacitance S provided across the electrodes 30, 32 is 500 pF, and the resistor R3 in the sensing circuit is 2.5 Mohm, then there will be a time lapse of 1.3582 mS between start 121 and finish 23 measured at a threshold of 2V. Using a grease probe S of the dimensions provided herein a capacitance of 500 pF is equivalent to a grease level of 50%.

The behaviour of the RC circuit is independent of the battery voltage in a given range. For example, in the embodiment shown in the FIGS. the circuit is independent from about 1.8V to 5.5V. The actual range can be selected for a given application to provide simplicity of components, sufficient voltage for driving the sensor, and sufficient battery life. In the embodiment shown in the FIGS. a ratiometric A/D reference to the battery voltage is used such that the effect of battery voltage degradation is cancelled out. To carry this out the same voltage is used as a source to charge the grease probe capacitor S and for the A/D reference at the microcontroller 27. This may cancel out voltage variations, including noise.

The battery life of the sensor 3 can be near to the shelf life of the battery itself when implemented with minimal power drain of once hourly sensing and sleep functions of current microcontrollers. Only rarely should access be required to the interior of the sensor 3.

Figure 22:
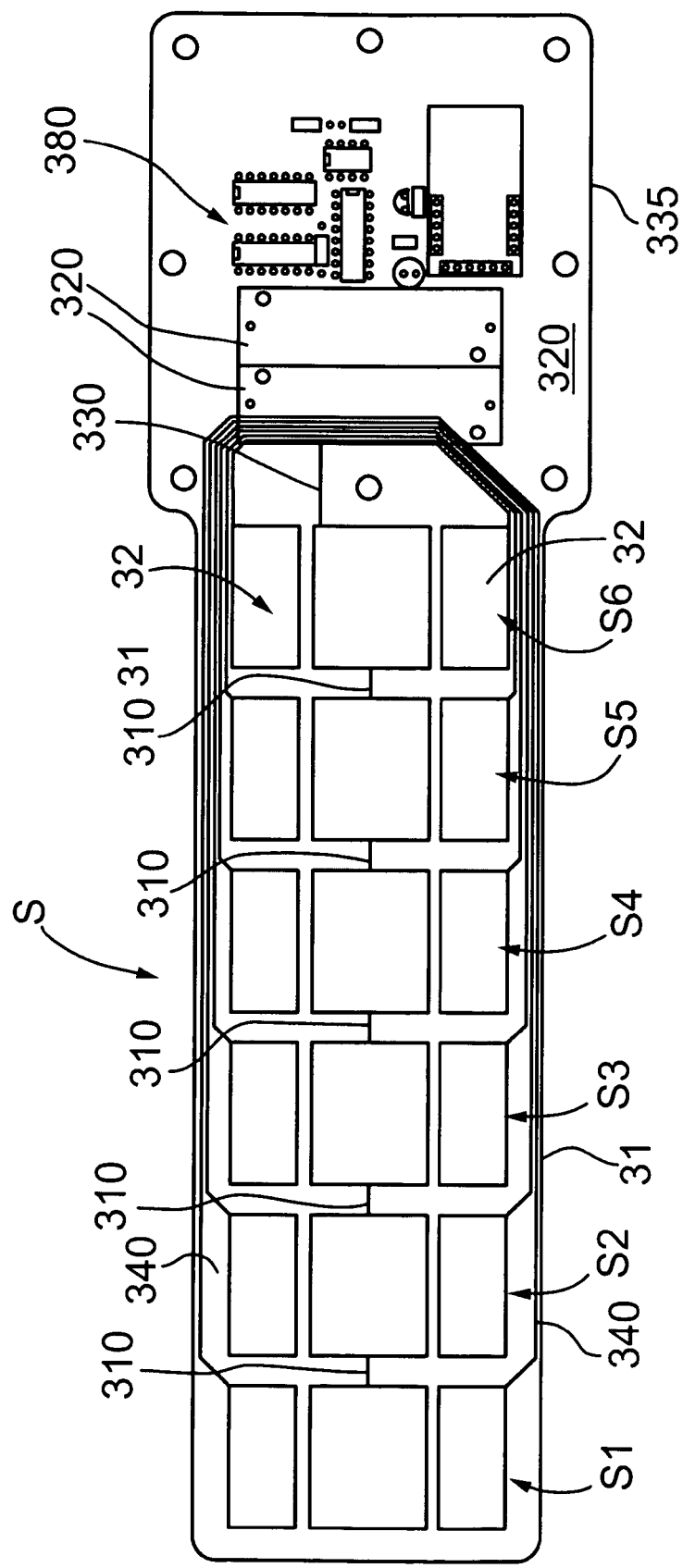
FIG. 22 is a graphic illustration of an alternate embodiment of a printed circuit board layer for a sensor.

Referring to FIG. 22 and above, the probe S has been sectioned into multiple pairs S1, S2, S3, S4, S5, S6 of electrodes 30, 32 (only one of which pair 30, 32 has been labeled in FIG. 22 to avoid unnecessarily cluttering the FIG.) and sensing circuitry 380. The embodiment of FIG. 22 has many of the features and functions of the probe S and sensing circuitry 38 of earlier embodiment while incorporating some of the alternative features referred to previously herein and some additional features. It is to be recognized that the features and functions of the respective embodiments can be interchanged as appropriate to create further alternate embodiments.

The electrodes 31 of each pair S1-S6 are joined together by conductive traces 310 and connected to ground pad 320 by link 330. In a similar manner to the probe S described previously, it is noted that while the sensing circuitry other than the probe electrodes are shown in FIG. 22 on one side of board 335, the pairs S1-S6 in the embodiment being described are on the opposite side of board 335 from the remainder of the sensing circuitry 380. Thus, while link 330 begins on the same side of the board 335 as the electrode pairs S1-S6, the link 330 proceeds through the substrate to meeting the pad 320.

Embodiments may provide the pairs are on the same surface as the sensing circuitry; however, it has been found to be preferable to provide the sensing circuitry and the electrodes on different surfaces, particularly in multilayer printed circuit board embodiments. Embodiments may also provide the sensing circuitry separate from a multilayer printed circuitry board, connected for example though input and output wires, not shown. Thus, the multilayer printed circuit board may form the probe, while the sensing circuitry is provided as part of a separate assembly connected to the probe for driving and reading the probe.

Each of the half electrodes 32 of a single pair for example S1 is joined by respective traces, for example traces 340, and connected to the remainder of the circuitry 380. Again, the reminder of the pairs of traces 340 will not be individually labeled to avoid unnecessarily cluttering the FIG. The respective connections of the pairs S1-S6 to the remainder of the circuitry 380 can best be seen in FIG. 23.

Figure 23:
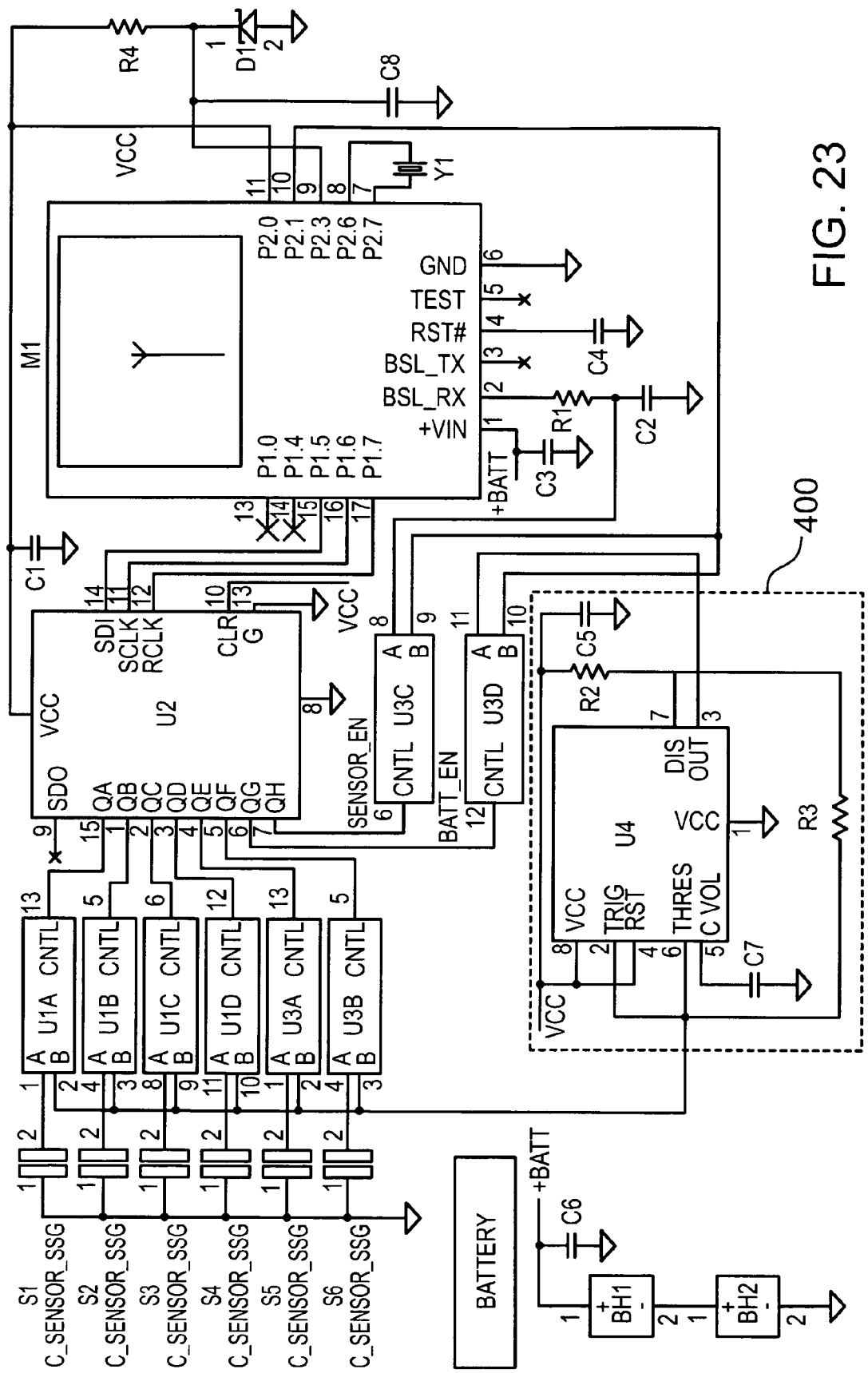
FIG. 23 is a schematic diagram with block overlay of an example embodiment of sensor circuitry for an example embodiment of a sensor utilizing the layer of FIG. 22.

Referring to FIG. 23, while one electrode 30 of each pair S1-S6 is connected to ground, the other electrode 32 of each pair is connected to a respective switch U1A, U1B, U1C, U1D, U3A, U3B, provide for example by a CD74HC4066 High Speed CMOS logic Quad Bilateral Switch of Texas Instruments. The switches are controlled through a selectable latch U2, such as a 74HC595 8-bit serial-in/serial or parallel-out shift register with output latches; 3-state—Philips, by a microcontroller M2, such as a CM91—Alutron Modules Inc of Aurora, Canada.

Each switch of switches U1A, U1B, U1C, U1D, U3A, U3B selectively connects its respective electrode 32 an oscillator 400, for example using a timer such as an LMC555 CMOS timer—National Semiconductor configured as an oscillator 400. The oscillator 400 oscillates according to the capacitance across the respective electrode pair S1-S6 to which the oscillator 400 is connected.

Connecting more than one switch U1A, U1B, U1C, U1D, U3A, U3B at a time can cause the oscillator 400 to oscillate in accordance with the combined capacitance of the electrode pairs of S1-S6 to which the oscillator 400 is connected. For example, the oscillator 400 is connected to each of the electrode pairs S1-S6 at the same time the oscillator 400 will see a capacitance from the combination of S1-S6 that is substantially similar to the capacitance of the probe S of previous embodiments provided the combined dimensions of the electrodes 30, 32 are similar in the two configurations.

The distance between two adjacent pairs, for example S1, S2, has been selected to be ¼ of an inch. Lesser or greater distances may be used as appropriate for the length and the sensitivity desired. Similarly, the electrodes may be lengthened or shortened for any particular application.

It is also possible to ground the inner electrode and sense using the outer electrode of a pair, or vice versa. It is also possible to connect each of the ground electrodes of the pairs S1-S6 together as a single electrode with a uniform width. A single width ground electrode either as the outer electrodes 32 or the inner electrode 30, in use with multiple sense electrodes 30 or 32 respectively will create pairs in a similar manner to pairs S1-S6. Accordingly, a single ground electrode configuration paired with one of the other electrodes of a pair S1-S6 is still considered to be a pair.

Where a single ground electrode is used with multiple sense electrodes, the height of each electrode pair is considered to be height of the sense electrode. A ground electrode haven't a different height from the sense electrode may introduce stray capacitance from outside the height of the sense electrode and possibly affect the accuracy of the probe. This may have to be taken into account for some applications; however, it would not likely be a factor in the grease sensing application described herein.

The latch U2 is also connected to switches U3C and U3D for selecting connection of the output of the oscillator 400 to the microcontroller M1 for reading of pulses from the oscillator 400 that are dependent on the capacitance from the sensor 3, or selecting connection of the battery for reading the level of the battery.

Figure 24:
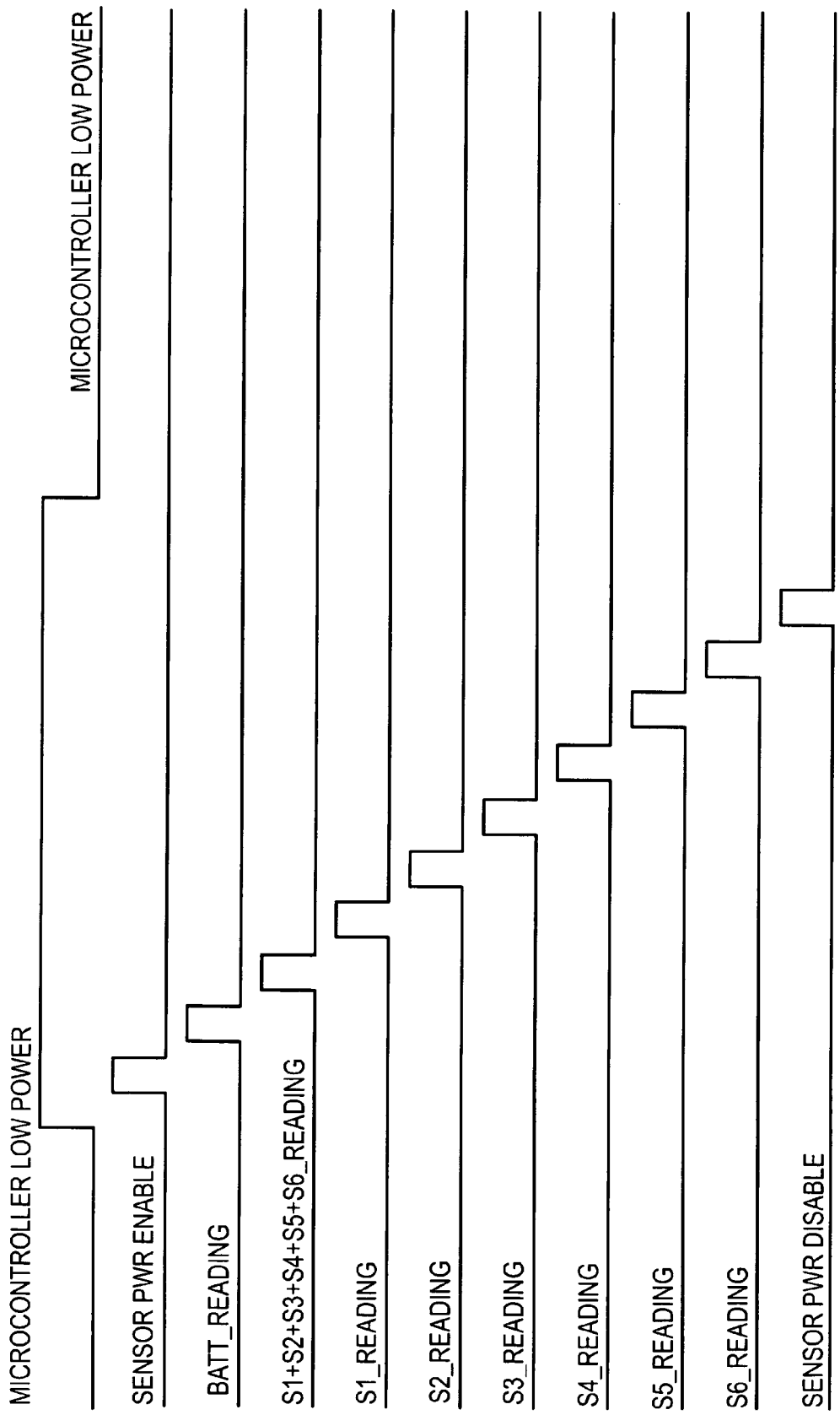
FIG. 24 is a graphic illustration of example timing within the sensor circuitry of FIG. 23.

Referring to FIG. 24, an example timing diagram provides for powering up the microcontroller (a high level on microcontroller low power), enabling the sensor 3, selecting battery level as an input for reading by the microcontroller M1, then selecting the oscillator 400 output as an input for reading by the microcontroller M1. When the microcontroller M1 is reading the oscillator 400 output all of the switches U1A, U1B, U1C, U1D, U3A, U3B are selected at the same time for connection to the oscillator 400 input, then each of switches U1A, U1B, U1C, U1D, U3A, U3B are selected in order. This timing first reads the battery level then the oscillator 400 output as affected by the combined probe S made up of all pairs S1-S6, then the oscillator 400 output as affected in order by the respective electrode pairs S1-S6.

Other timing could be performed. For example, the battery level and the combined probe S could be read. As another example, alternate combinations of pairs such as S1 and S2 could be read at the same time.

Figure 25:
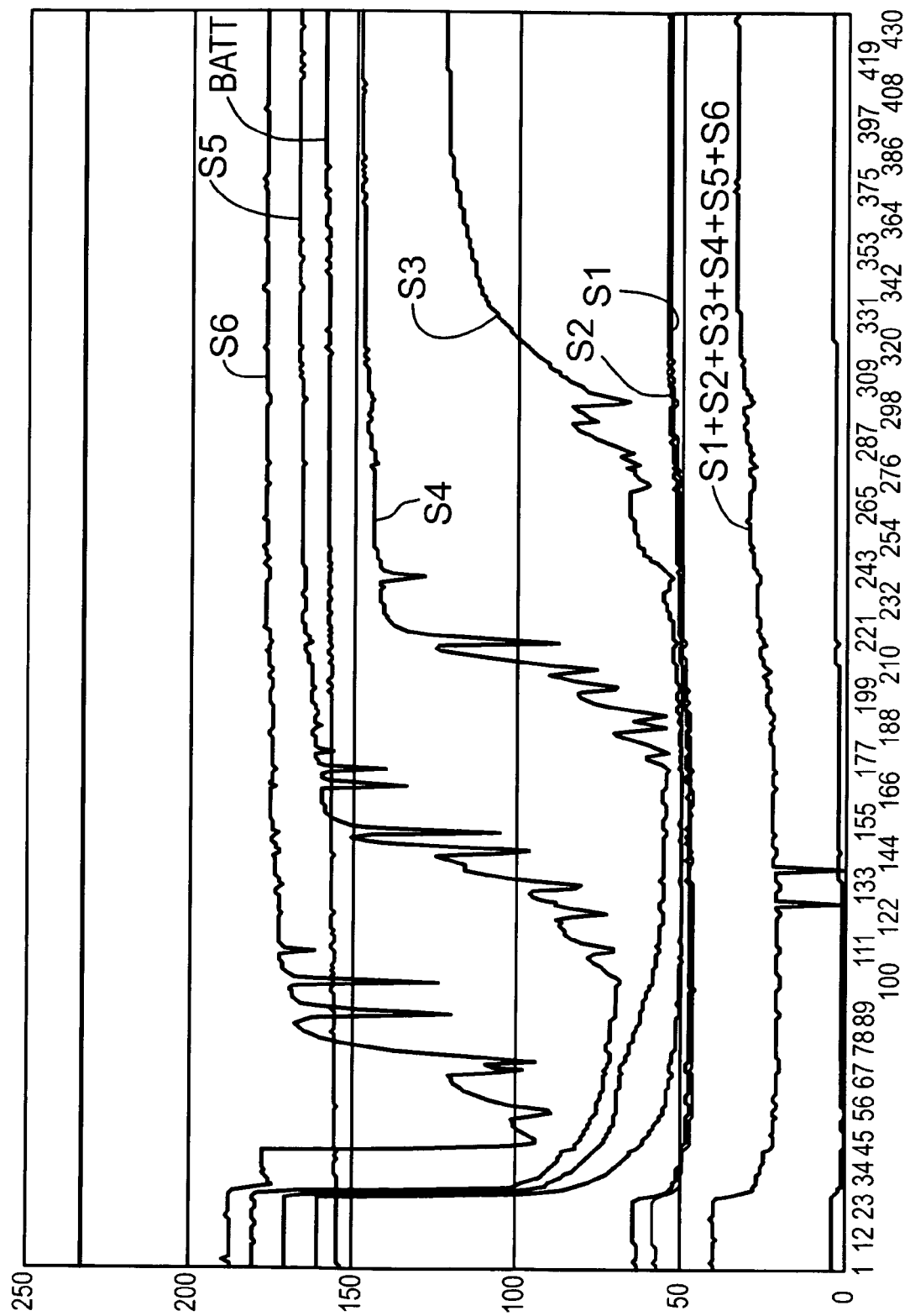
FIG. 25 is a graphic illustration of example readings from utilizing a sensor having the layer of FIG. 22 in use in a test environment.

Referring to FIG. 25, values derived from the oscillator 400 output readings by the microcontroller M1 using the oscillation method over a plurality of cycles as the level of grease rose in a test environment over time have been plotted any labeled accordingly. The test configuration included placement of the sensor 3 in a clear acrylic tank replica of a four inch Canplas INTERCEPTOR. 40 Liters of water mixed with 2 liters of oil and lard mix discharged every 10 minutes into the tank replica. For the test environment the sensor 3 took readings at two second intervals. The static water line was at the top of the first segment S6 and the grease was built down to cover four out of the six segments S6, S5, S4, S3. The bottom two sensors S2, S1 were in water throughout the test. The initial readings to the left can be ignored as the test environment settled down. It can be seen that reading of individual sensor pairs for example S6 provides a rapid rise with a distinct lower level and a distinct upper level as the pair S6 is initially not in grease, then is partially in grease, and finally is covered by grease.

In the test configuration the levels of the readings decrease for one sensor pair to the next. For example, the upper level of S1 is higher than the upper level for S2. The effect may be caused by capacitance from one pair to the net and manufacturing tolerances. This demonstrates a benefit of using a threshold to determine when any one pair is in grease rather than determining an actual level of grease on any one pair. One could compensate for the variance; however, it has not been found necessary in the particular application described herein as the difference between the upper and lower level for each reading is sufficient select a threshold between the levels to distinguish the upper and lower level of each pair to determine whether or not a particular sensor pair is substantially covered by grease, and the effect is consistent and predictable, for example after being empirically determined.

In the embodiment utilized to produce the graph of FIG. the microcontroller M1 derives the values by counting pulses read from the oscillator 400 output. The number of pulses in a given time period are a characteristic of a signal (the oscillator 400 output) that varies in accordance with the capacitance between sensor electrodes 30, 32.

The trend for any particular electrode pair, for example S1, moves upwardly with grease level over time from the lower level to the upper level. However, there are fluctuations, particularly when grease is partially covering a pair S1. These fluctuations may result, for example, from settling of the grease during times of inactivity. This may allow water to be introduced between the probe S and the grease. This may cause the capacitance between the electrodes to rise and affect the readings accordingly.

Also, there may be an emulsion layer of combined between the grease and water. This emulsion layer may comprise, for example, grease, detergent and water. This layer will have a dielectric constant somewhere between grease and water. The thickness of the layer and affect on capacitance may vary. The emulsion layer may vary, for example, with wash cycles described previously. A wash cycle may remove the emulsion layer, allowing it to form again over time.

Surprisingly, the detergent in the emulsion layer tends to keep the sensor 3 free from grease below the grease layer. It is possible for applications where grease build-up may be a concern that compensation may be desirable for the grease build-up. As will be understood by persons skilled in the art, many compensation schemes may be utilized.

Rather than using the value of the reading of an electrode pair directly as an indication of where the grease level is on the electrode pair (a low number no grease, a high number all grease, a low middle number some grease, a middle number more grease, and a high middle number more grease but not covered), the reading of a pair can be used to indicate whether it is above or below a threshold value of the pair. If on one side of the threshold value then the pair is considered to be covered with grease and if on the other side of the threshold value then the pair is considered not to be covered in grease. A level of grease can then be approximated from the pairs that are in grease and those that are not.

The threshold can be introduced in the sensor 3 or the remote unit 5. In one test embodiment the sensor 3 was configured to transmit the readings to the remote unit 5 and the remote unit 5 introduced the threshold to determine if a pair was considered to be in grease. The threshold used, as an example, was a reading of eighty percent grease meant the pair was in grease. The bars of the remote unit 5 display were illuminated accordingly. It was found that this threshold resulted in a fairly stable indication of grease for any particular pair. Other thresholds could be used as desired.

Figure 26:
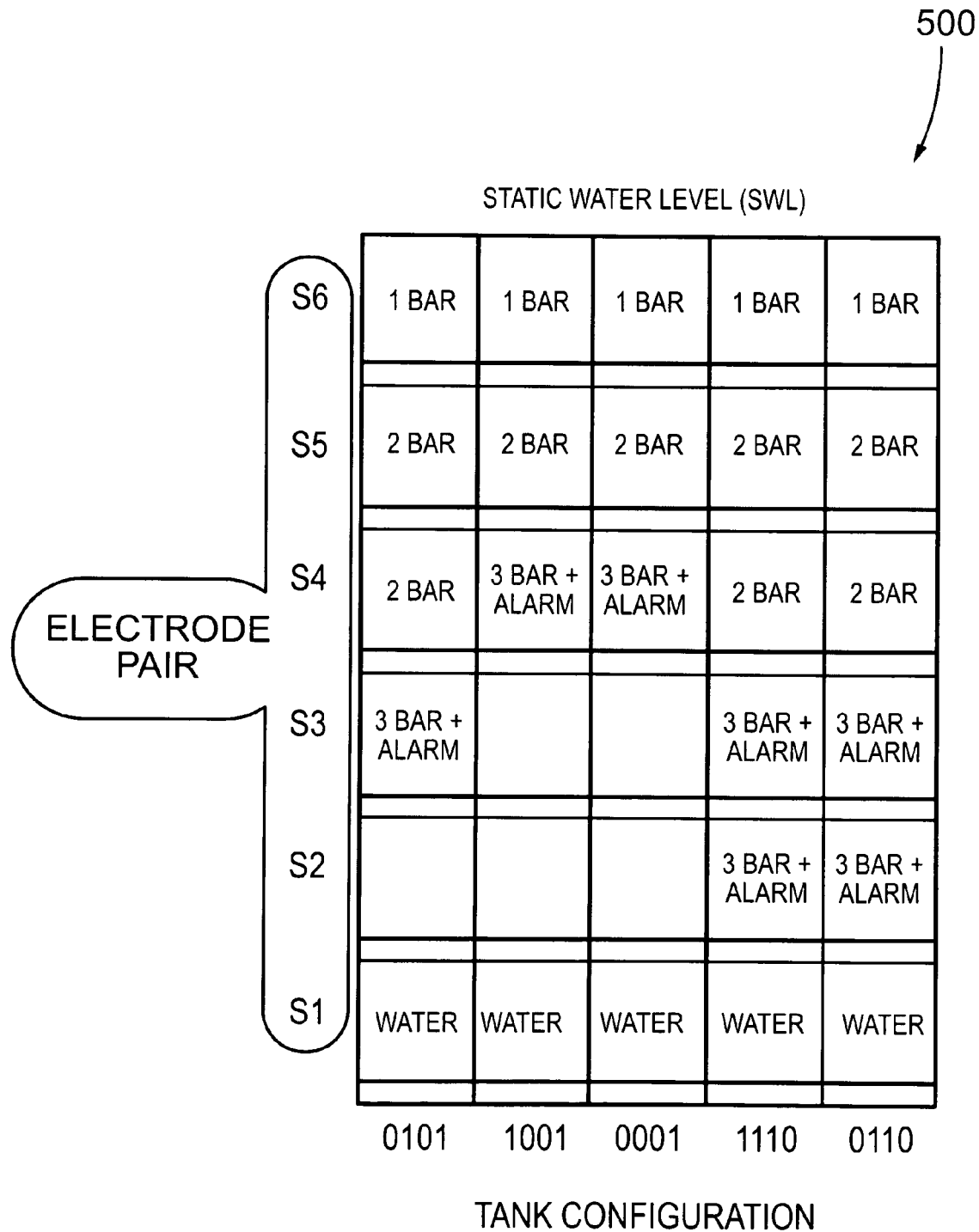
FIG. 26 is a graphic illustration of an example conversion matrix for use in converting readings from a sensor to bars of a display.

Referring to FIG. 26, a conversion matrix 500 converts a reading from the sensor 3 to a number of bars to be illuminated on the remote display 5 for use in association with different tank 7 configurations. In the embodiment discussed immediately above the conversion matrix was stored and utilized by the remote unit 5. It could equally be stored in the sensor 3 with the result after use of the matrix 500 being transmitted to the remote unit 5. As described previously, the remote unite 5 or the sensor 3, as applicable, would need to know which tank 7 configuration was in use. The matrix 500 has different tank 7 configurations. As an example, for tank 7 configuration 0101 if S6 is determined to be in grease then 1 bar of the display is illuminated by the remote unit 5. If S5 is determined to be in grease then 2 bars of the display are illuminated by the remote unit 5. If S4 is determined to be in grease then 3 bars of the display are illuminated by the remote unit 5. If S5 is determined to be in grease then 3 bars of the display are illuminated by the remote unit 5 and an alarm is sounded by the remote unit 5. Other tank 7 configurations have different matrix settings depending, for example, on their volume and depth.

Many different forms of alarm can be used such as audible or visual alarms. The remote unit 5 and the sensor 3 can each be provided An alarm can be sounded au A visual alarm may included for example flashing lamp, such as LEDs D1, D2 of the remote unit 5. An audible alarm can be provided for example through a piezoelectric device, such as PZ1 of FIG. 27, which could similarly be incorporated into the remote unit 5.

S1 is always to be in water and sensing of this is indicated. If S1 is not in water then there is a malfunction with the tank 7. A no water condition can be seen from viewing the display.

Referring again to FIG. 16, a DIP manual switch 420 is provided to allow manual input of the tank 7 configuration, such as for example the binary tank 7 configurations utilized in FIG. 25.

The settings of the switch 420 are used by the microcontroller U1 to convert the readings from the sensor 3 to illumination bars of the display in accordance with the conversion matrix 500. It is understood that other methods could be used to indicate the particular tank 7 configuration some of which were previously described. Also, the data contained in the matrix 500 needed not be stored in a matrix format, but could for example be stored in known discrete memory locations for retrieval.

The multiple pair embodiment of probe S can be used with the method of reading a RC circuit output (a signal) which has a time constant that is a characteristic which varies with the capacitance between the sensor electrodes 30, 32. For example, the requisite features from the sensing circuit 38 can be combined with the corresponding requisite features of the sensing circuitry 380 with the timing adjusted to account for the change in reading method.

Referring to FIG. 23 again, the sensor 3 is also provided with a ship mode as mentioned previously. In the ship mode transmissions from the sensor 3 are silenced. Also, the sensor 3 stops driving the capacitor and stops sensing signals having a characteristic dependent on the capacitance between the electrodes. The sensor 3 can be provided with a radio frequency (RF) wireless receiver (M1 is a wireless transceiver, both a transmitter and a receiver) for receiving acknowledgement signals indicating a transmitted signal has been received, and if the receiver M1 has not received an acknowledgement signal for at least one transmitted signal then the first circuitry enters the ship mode.

Figure 16C:
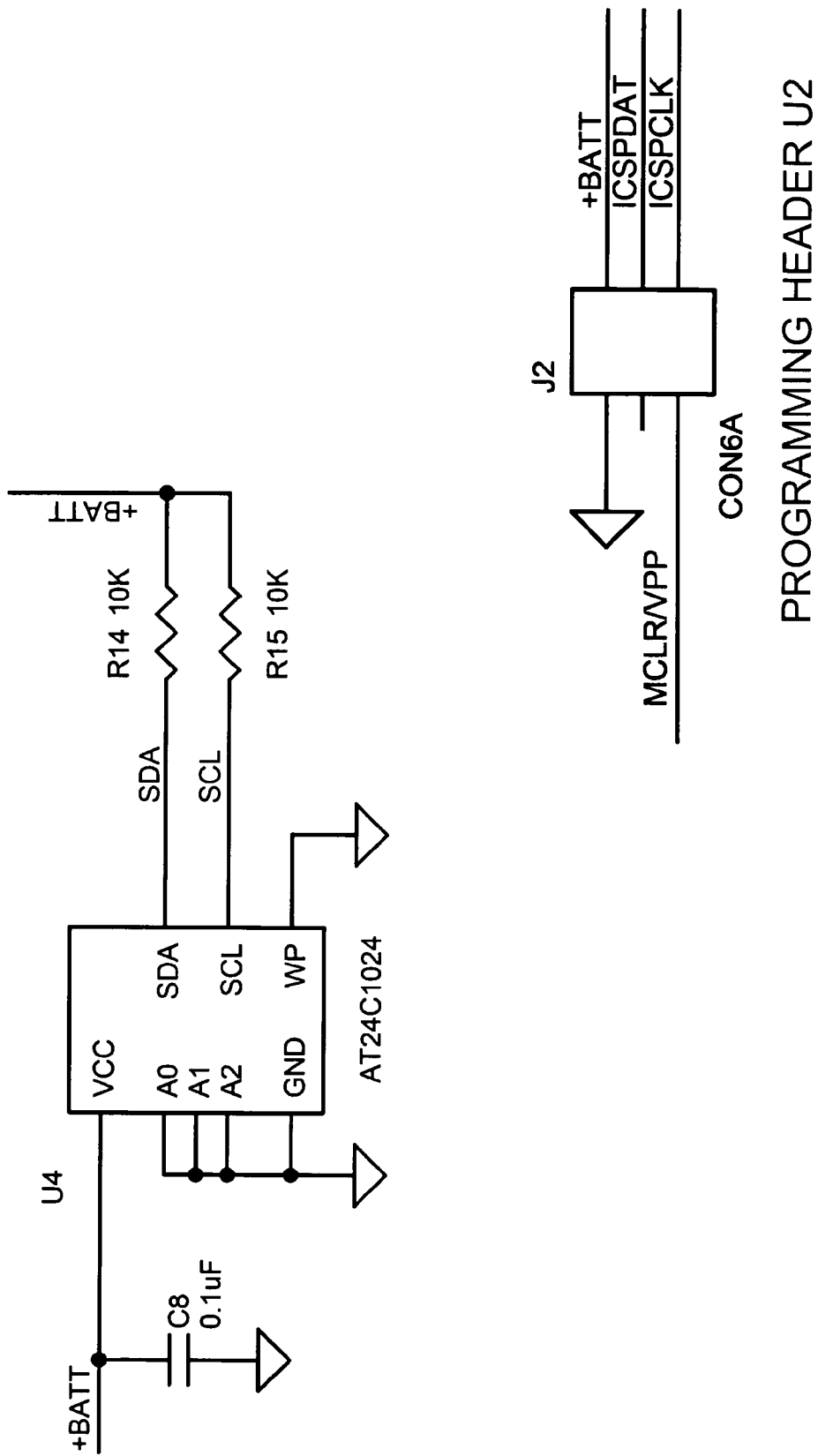
Figure 27:
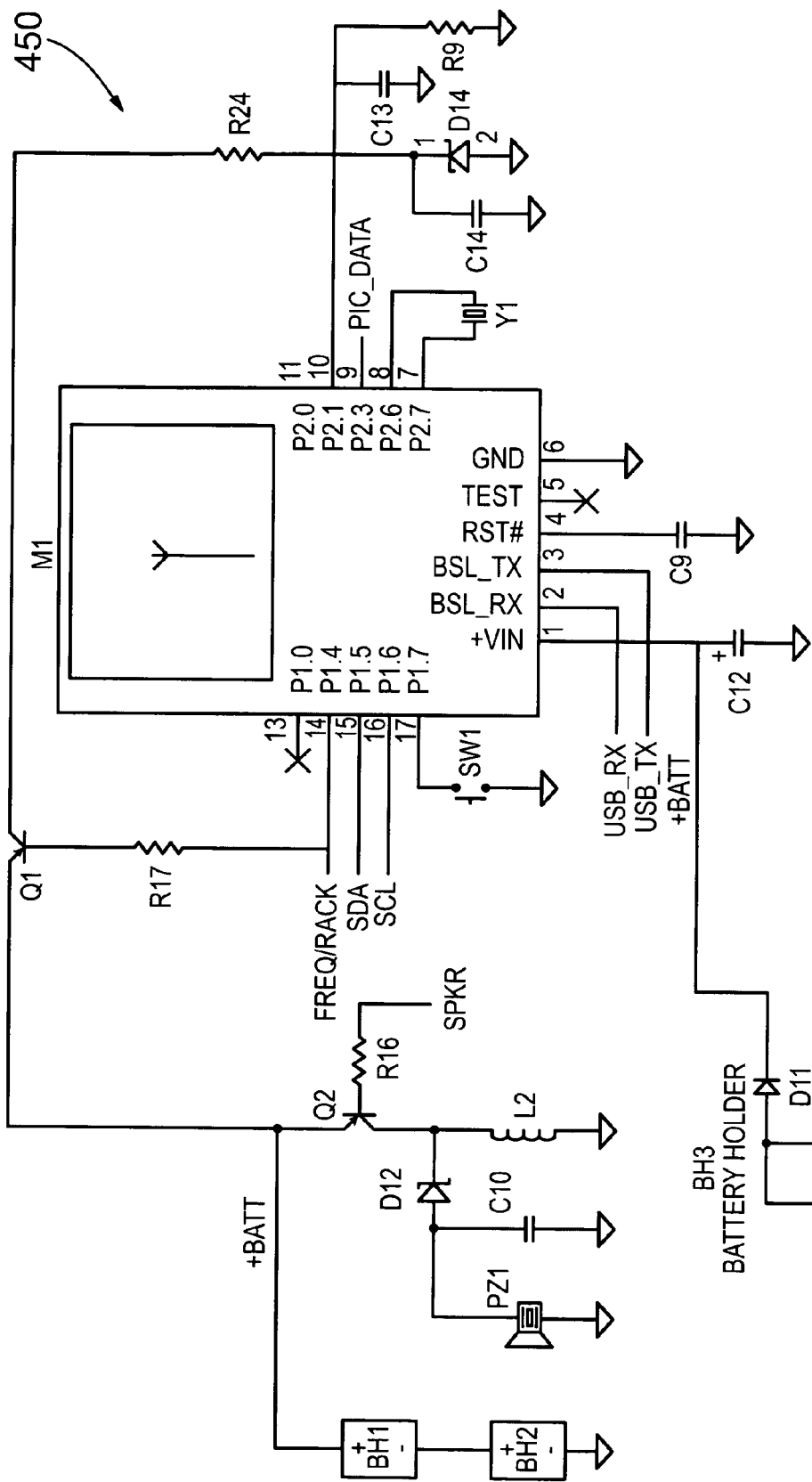
FIG. 27 is a schematic diagram of an example wireless transceiver block for use in a remote unit.

When in ship mode, the receiver M1 waits to receive a signal wirelessly through the wireless receiver M1 indicating that the sensor 3 should switch to the operating mode, and the sensor 3 switches from the ship mode to the operating mode on receipt of such signal. M1 includes sufficient memory and processing capabilities in addition to being a wireless transceiver to carry out the functions described herein M1 has been implemented using a CM91 of Alutron Modules Inc.; however, it is to be recognized that the functions of M1 could be provided in a separate microcontroller and transceiver, or receiver and transmitter. A suitable transceiver may be for example a Bluetooth wireless transceiver, many of which are available from a variety of suppliers, such as an OEM Bluetooth-Serial Module, Parani-ESD provided by SENA (www.sena.com). Referring to FIG. 27, the receiver circuitry of FIG. 16C can be replaced by the receiver circuitry 450 to provide a RF wireless transmitter and a RF wireless receiver, M1 being a wireless transceiver. The remote unit 5 is then configured to wirelessly transmit an acknowledgement signal to the sensor 3. If the batteries are removed from the remote unit 5, or the remote unit 5 is otherwise silenced, it will not transmit the acknowledgement signal.

Figure 28:
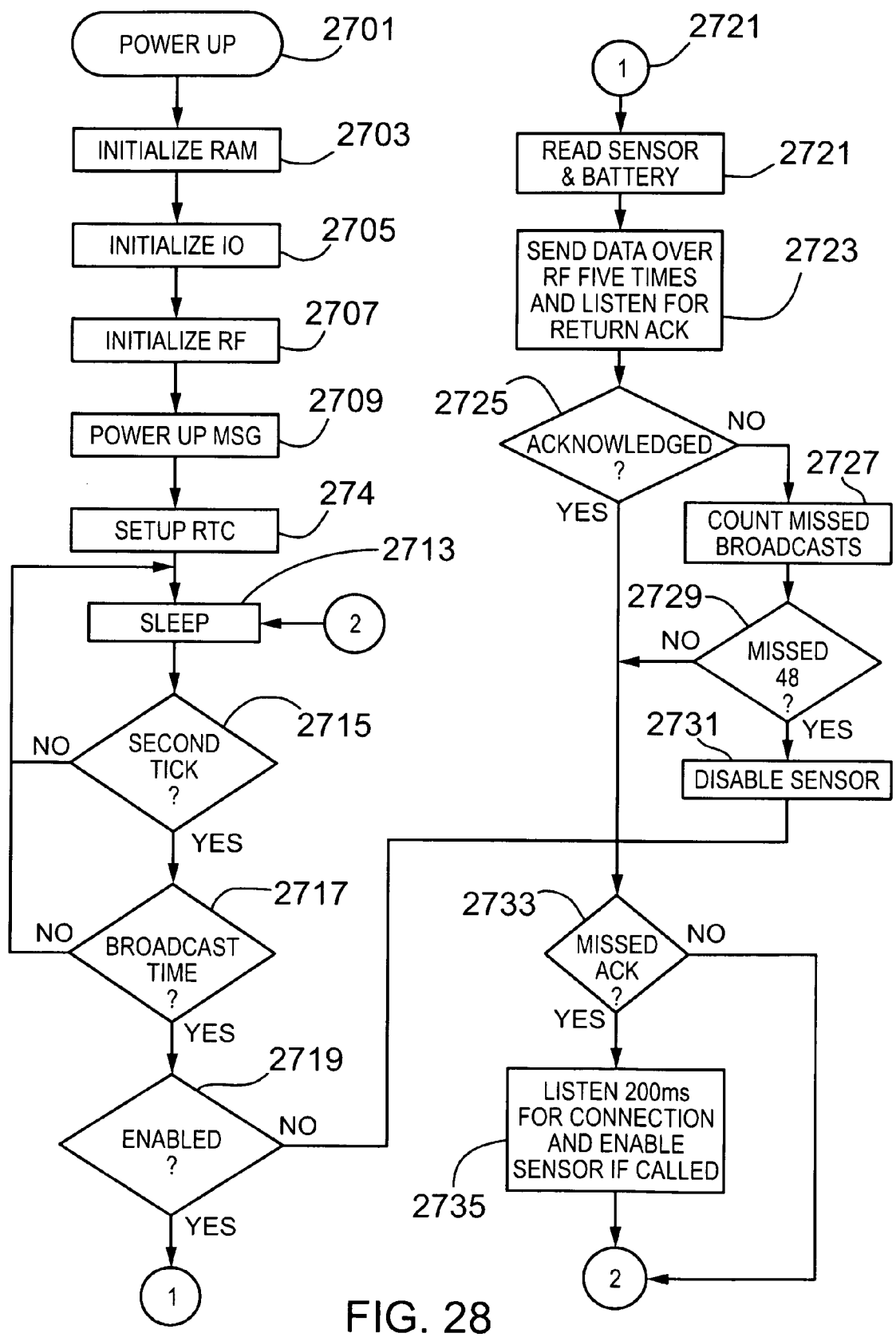
FIG. 28 is an example flow diagram for control of a sensor in accordance with an embodiment of an aspect of the present invention.

Referring to FIG. 28, an example flow chart for the operation of the sensor 3 employing the ship mode and wireless transmission and reception capabilities described herein is shown. The operation of the sensor 3 is controlled by a suitable program stored in memory of M1. At power up 2701 all elements of the sensor 3 except a clock, such as clock E of FIG. 3 are powered down (sleep mode). The clock E sends an interrupt to M1 and M1 powers up the sensor 3, initializing memory at 2703, input/output interfaces at 2705, and the RF transceiver at 2707. At 2709 a power up message is transmitted to the remote unit 5 so that unit 5 can commence powering up. At 2711 the clock E referenced above is setup. At 2713 the sensor 3 then go to sleep mode describe earlier. The controller M1 will likely be out of sync with the clock E; so, at 2715 the controller checks to see if time has passed on the clock E. The controller M1 then checks at 2717 to see if it is time for to read the sensor 3 and transmit to the remote unit 5 (broadcast) as discussed previously. The processor M1 can be set to read and transmit more or less frequently as desired. For a restaurant grease sensor application once per hour has been found to be adequate updating of the remote unit 5 with long battery life. If at 2715 time has not passed on the clock E or if at 2717 it is not to read the sensor 3 and transmit to the remote unit 5 then the sensor 3 returns to sleep at 2713.

At 2719 the sensor 3 then checks to see that it is enabled. This is a setting for example stored as a system variable to toggle between operation mode and ship mode as discussed previously. When "enabled" the sensor 3 is in operation mode; when disabled the sensor 3 is in ship mode. If at 2719 the sensor 3 is disabled then the sensor 3 proceeds to 2733 and checks to see if the sensor entered disable mode because of a missed acknowledgement as will be discussed below, and continues processing. As discussed previously, it may be desirable to disable and to enable the sensor 3 through means other than the missed acknowledgement method described herein. For example, a push button or proximity sensor could be provide to cause a change of state from operation to ship mode and from ship mode to operation mode with consequent amendment to the programmed control of the sensor 3.

If at 2717 the sensor 3 is enabled then at 2721 the sensor 3 proceeds to read the probe S and the battery as described previously. At 2723 the read data is transmitted wirelessly to the remote unit 5 (for example in five repeated packets) and the sensor 3 listens for an acknowledgement signal. If an acknowledgement signal is missed at 2725 then at 2727 the sensor 3 rebroadcasts the transmission and counts the consecutives missed broadcasts (unacknowledged transmissions). If at 2729 the sensor 3 counts forty-eight missed broadcasts then the sensor 3 is disabled at 2731. The sensor 3 can be disabled for example by entering ship mode as described previously. Forty-eight unacknowledged transmissions are considered to be a missed acknowledgement. The sensor 3 will then have missed an acknowledgement at 2733 so the sensor will listen at 2735 for a signal indicating that the sensor 3 should return to operation mode. When the signal is received the sensor 3 will return operation mode by returning to sleep at 2713 and continue processing.

It is recognized that the flow of programmed control for the sensor 3 illustrated in FIG. 27 is an example only and that alternate embodiments can be created to provide those of the functions that have been described herein as desired.

Alternate embodiments are possible. The embodiments described herein are illustrative and not limiting. As just one example, the probe could be configured on a single layer printed circuit board with an appropriate covering to protect against the environment while being thin enough to allow sufficient capacitance for the purposes described herein. For example, a sprayed resin coating can be adequate.

It will be understood by those skilled in the art that this description is made with reference to the example embodiments thereof and that it is possible to make other embodiments employing the principles of the invention which fall within its spirit and scope as defined by the following claims.

We claim:

1. A sensor comprising:
   electrodes on an internal surface between first and second printed circuit board substrate layers of a multilayer printed circuit board, and
   sensing circuitry to drive the electrodes and to read a signal having a characteristic based upon the capacitance between the electrodes including capacitance external to the multilayer printed circuit board,
   wherein the first printed circuit board substrate layer of the multilayer printed circuit board is thicker than the second printed circuit board substrate layer such that capacitance external to the multilayer printed circuit board is primarily contributed from adjacent the second printed circuit board substrate layer.

2. The sensor of claim 1 wherein the electrodes are on an internal surface of the second printed circuit board substrate layer and the sensing circuitry is on an opposing external surface of the second printed circuit board substrate layer.

3. The sensor of claim 2 wherein components for the sensing circuitry are assembled to the multilayer printed circuit board such that the board and components are a multilayer printed circuit board assembly.

4. A sensor comprising:
   A multilayer printed circuit board including a probe having two electrodes side by side on a buried first surface between first and second printed circuit board substrate layers of the multilayer printed circuit board, and sensing circuitry on an outer second surface of the multilayer printed circuit board to drive the electrodes and sense a signal having a characteristic dependent on the capacitance between the electrodes, and
   a cover about the sensing circuitry in sealed connection with the printed circuit board outer second surface.

5. The sensor of claim 4 wherein the first surface and the second surface are opposing surfaces of the first printed circuit board substrate layer of the multilayer printed circuit board.

6. The sensor of claim 5 wherein the second printed circuit board substrate layer is sealed to the first surface of the first printed circuit board substrate layer about the two electrodes.

7. The sensor of claim 5 wherein the wherein the capacitance between the electrodes is provided through the first printed circuit board substrate layer of the multilayer printed circuit board and the first printed circuit board substrate layer is sufficiently thin such that the probe has a sufficient range of capacitance for sensing when the first printed circuit board substrate layer is adjacent air and when the probe is adjacent water.

8. The sensor of claim 5 wherein the electrodes are separated by a narrow uniform gap such that the probe has a sufficient range of capacitance for sensing when the probe is adjacent air and when the probe is adjacent water.

9. The sensor of claim 5 wherein the capacitance between the electrodes is the capacitance between the electrodes through the first printed circuit board substrate layer of the multilayer printed circuit board and the first printed circuit board substrate layer is sufficiently thin and the electrodes are separated by a narrow uniform gap such that the probe has a sufficient range of capacitance for sensing when the probe is adjacent air and when the probe is adjacent water.

10. The sensor of claim 9 wherein the sensing circuitry drives the electrodes to charge the capacitance between the electrodes and senses a charging time constant of the signal.

11. The sensor of claim 10 wherein the sensing circuitry drives the electrodes to charge the capacitor and senses a frequency of the signal.

12. The sensor of claim 11 wherein the sensor is configured to sleep for an extended time between successive cycles of driving the electrode and sensing the signal.

13. The sensor of claim 12 wherein the sensor further comprises a wireless radio frequency transmitter to transmit a signal remote from the sensor containing information based on the sensed capacitance.

14. A sensing system comprising:
    the sensor of claim 13, and
    a remote unit to receive the signal and determine a level of grease on the probe.

15. The system of claim 14, wherein the remote unit further has a display to display information about a level of grease where the sensor is installed.

16. A grease interceptor comprising:
    a tank to intercept grease, and
    the sensing system of claim 14,
    wherein the sensor is installed in the tank and senses capacitance of contents within the tank and the remote unit displays a level of grease within the tank.

17. A sensor comprising:
    a printed circuit board substrate having opposing first and second surfaces including a probe having two electrodes side by side on a first surface of the printed circuit board, and sensing circuitry on a surface of the printed circuit board substrate to drive the electrodes and sense a signal having a characteristic dependent on the capacitance between the electrodes through the first and second surfaces of the printed circuit board substrate.

18. A method of sensing grease within a grease interceptor tank comprising:

driving with a pulse a sensor comprising electrodes on an internal surface between first and second printed circuit board substrate layers of a multilayer printed circuit board, and sensing circuitry to drive the electrodes and to read a signal having a characteristic based upon the capacitance between the electrodes including capacitance external to the multilayer printed circuit board, wherein the first printed circuit board substrate layer of the multilayer printed circuit board is thicker than the second printed circuit board substrate layer such that capacitance external to the multilayer printed circuit board is primarily contributed from adjacent the second printed circuit board substrate layer, sensing the time constant of a resistor-capacitor (RC) circuit provided by the sensor through the probe to determine a measure of capacitance for the probe when in contact with grease, water or a combination thereof.

19. The method of claim 18 further comprising wirelessly transmitting a signal remote from the sensor containing information based on the sensed capacitance.

20. The method of claim 19 further comprising remotely receiving the signal, and determining a level of grease on the probe.

21. The method of claim 19 wherein the sensor is installed in a grease interceptor tank, and the method further comprises remotely receiving the sensor signal, and determining and displaying to a user a level of grease in the tank based on the received signal.

* * * * *